US012664475B2

(12) United States Patent
Butvinik

(10) Patent No.: US 12,664,475 B2
(45) Date of Patent: Jun. 23, 2026

(54) SYSTEM AND METHOD FOR DETERMINING WHEN AN UPDATE OF AN ONLINE FRAUD DETECTION MACHINE LEARNING (ML) MODEL IS REQUIRED

(71) Applicant: Actimize LTD., Ra'anana (IL)

(72) Inventor: Danny Butvinik, Haifa (IL)

(73) Assignee: Actimize LTD., Ra'anana (IL)

( * ) Notice: Subject to any disclaimer, the term of this patent is extended or adjusted under 35 U.S.C. 154(b) by 505 days.

(21) Appl. No.: 18/239,146

(22) Filed: Aug. 29, 2023

(65) Prior Publication Data

US 2025/0077935 A1      Mar. 6, 2025

(51) Int. Cl.
G06N 20/00 (2019.01)
(52) U.S. Cl.
CPC .................................... G06N 20/00 (2019.01)
(58) Field of Classification Search
CPC ..................................................... G06N 20/00
See application file for complete search history.

(56) References Cited

U.S. PATENT DOCUMENTS

| 12,321,876 B2 * | 6/2025 | Singh | ....................... B25J 9/163 |
| 2021/0184958 A1 * | 6/2021 | Kolar | ...................... H04L 43/14 |
| 2023/0177407 A1 * | 6/2023 | Gupta | ...................... G06N 3/08 |
| | | | 706/12 |
| 2024/0211798 A1 * | 6/2024 | Swaroop | .......... G05B 19/41885 |

FOREIGN PATENT DOCUMENTS

| JP | 2025529889 A | * | 9/2025 | ............. G06N 20/00 |

OTHER PUBLICATIONS

H. Kanda, H. Okamura and T. Dohi, "A Note on Optimal Retraining Strategy for ML Systems," 2023 10th International Conference on Dependable Systems and Their Applications (DSA), Tokyo, Japan, 2023, pp. 730-733 (Year: 2023).*
An Online Drift Detection and Model Refresh Policy for Streaming Classifiers with Budgeted Retraining Costs. (2023). Journal of Data Science, Predictive Analytics, and Big Data Applications, 8(6), 1-20. https://helexscience.com/index.php/JDSPABDA/article/view/2023-06-04 (Year: 2023).*

* cited by examiner

*Primary Examiner* — Michael R Vaughan
(74) *Attorney, Agent, or Firm* — SOROKER NORDMAN RIBA

(57)                    ABSTRACT

A computer-implemented method for determining when an update of an online ML model is required. The computer-implemented method includes: (i) receiving a batch of financial transactions data; (ii) selecting a set of features from the one or more features; (iii) detecting a drift and a drift type in each feature in the selected set of features, by operating a drift detection model thereon; (iv) generating a batch-representation-vector of drift type for each feature in the selected set of features; (v) receiving a predicted-decision of update-needed by forwarding the generated batch-representation-vector to a trained MetaBDMM model, the predicted-decision of update-needed is one of: update-needed; and update-not-needed, and (vi) forwarding the predicted-decision of update-needed to the online ML model. When the predicted-decision of update-needed is update-needed, the online ML model performs an update and when the predicted-decision of update-needed is update-not-needed the online ML model doesn't perform the update.

9 Claims, 20 Drawing Sheets

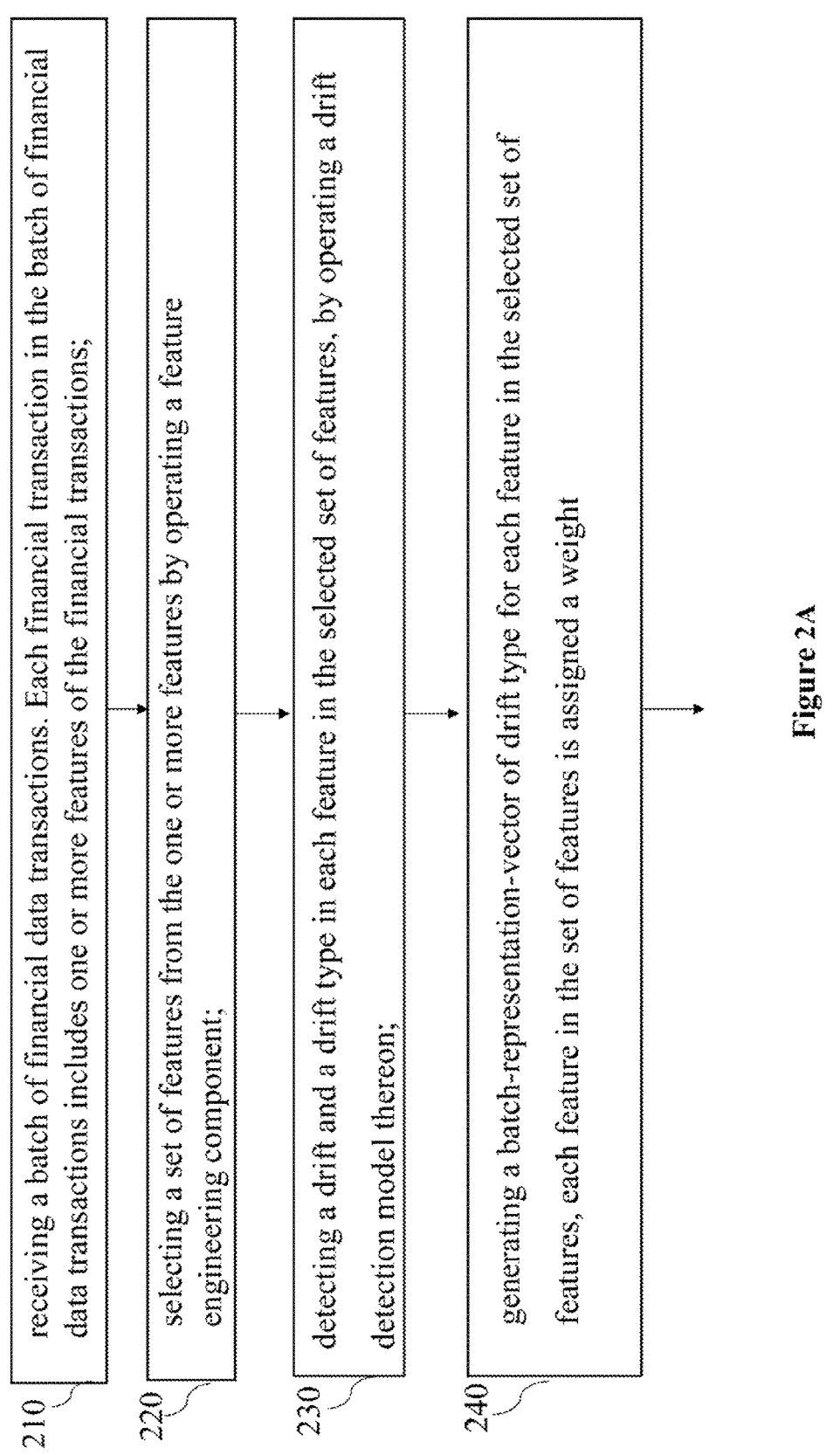

200

210 receiving a batch of financial data transactions. Each financial transaction in the batch of financial data transactions includes one or more features of the financial transactions;

220 selecting a set of features from the one or more features by operating a feature engineering component;

230 detecting a drift and a drift type in each feature in the selected set of features, by operating a drift detection model thereon;

240 generating a batch-representation-vector of drift type for each feature in the selected set of features, each feature in the set of features is assigned a weight

Figure 2A

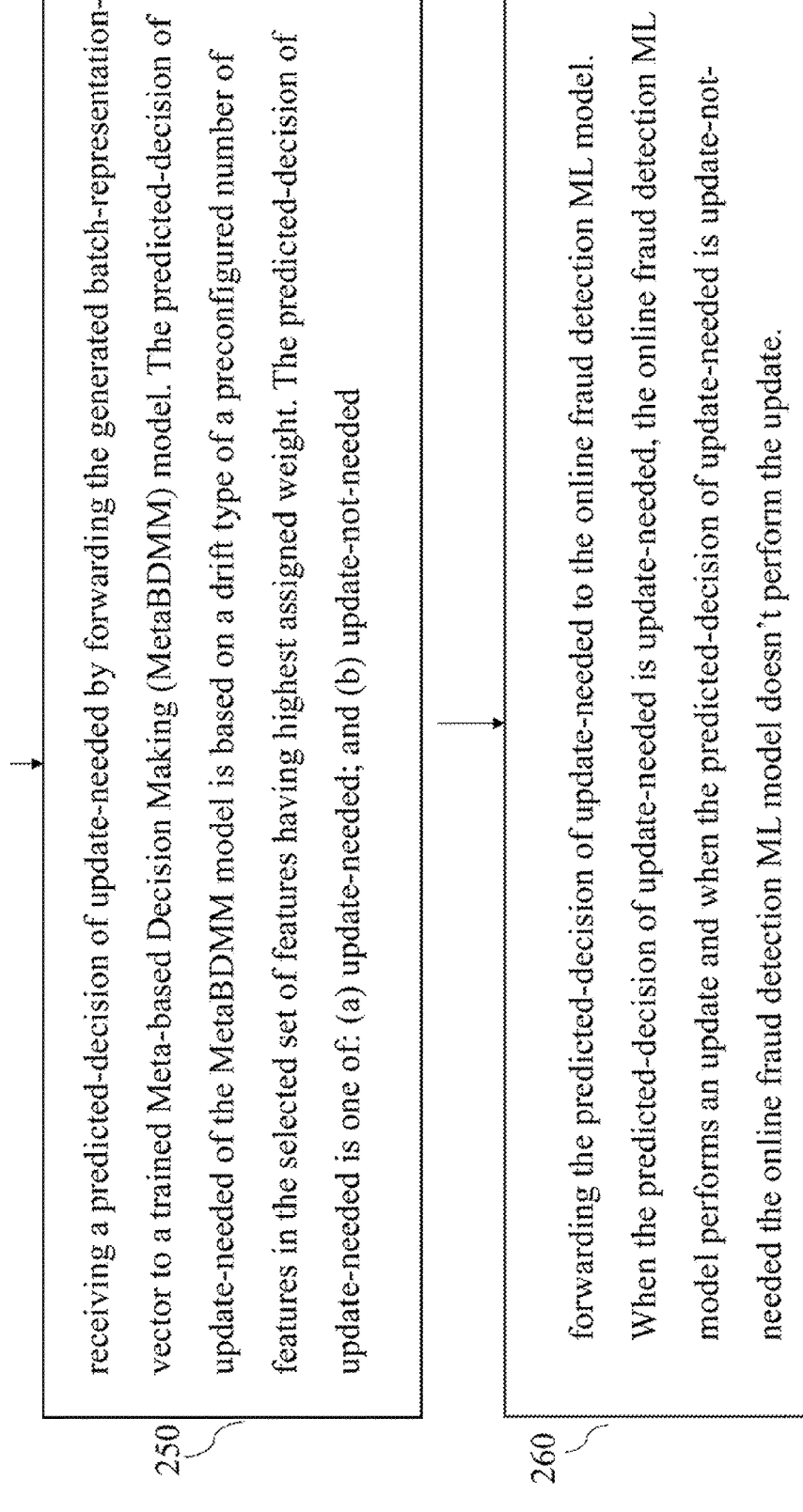

receiving a predicted-decision of update-needed by forwarding the generated batch-representation-vector to a trained Meta-based Decision Making (MetaBDMM) model. The predicted-decision of update-needed of the MetaBDMM model is based on a drift type of a preconfigured number of features in the selected set of features having highest assigned weight. The predicted-decision of update-needed is one of: (a) update-needed; and (b) update-not-needed

250 forwarding the predicted-decision of update-needed to the online fraud detection ML model. When the predicted-decision of update-needed is update-needed, the online fraud detection ML model performs an update and when the predicted-decision of update-needed is update-not-needed the online fraud detection ML model doesn't perform the update.

SYSTEM AND METHOD FOR DETERMINING WHEN AN UPDATE OF AN ONLINE FRAUD DETECTION MACHINE LEARNING (ML) MODEL IS REQUIRED

TECHNICAL FIELD

The present disclosure relates to the field of meta-learning which develops Machine Learning (ML) models capable of learning how to learn, and more specifically, to the field of meta-leaning to efficiently handle dynamic and evolving data patterns to maintain high performance of an online fraud detection ML model by indicating the online fraud detection ML models when to perform an update.

BACKGROUND

Current online fraud detection Machine Learning (ML) models either do not update at all or implement a passive update of online fraud detection models when the model is running in production environment. In the technical solutions that do not passively update the online fraud detection model, performance of the online fraud detection model may decline when there are statistical changes in the incoming data points.

Otherwise, technical solutions that implement the passive update, by having the online fraud detection models update themselves in real-time on every data point, e.g., financial transaction, may have several deficiencies. First, passive update has high computational cost of continuously updating the online fraud detection model with each incoming data point, e.g., financial transaction, which may be resource-intensive, time-consuming, and potentially slow down the system's responsiveness and scalability.

Second, different sources of data drift in the stream of incoming data points can introduce variations, anomalies, or shifts in the data distribution of incoming data points, which may either not be captured or may not be interpreted accurately, thus making the update of the online fraud detection model redundant or having the performance of the online fraud detection model negatively affected.

Meta-learning is a branch of ML paradigm that focuses on developing algorithms which are capable of learning how to learn. Meta-learning algorithms aim to acquire knowledge or strategies from previous learning experiences and apply them to new tasks or domains, thus, considering the learning process.

Meta-learning can enhance the decision-making capabilities of the ML models. Therefore, there is a need for a technical solution that will leverage meta-learning techniques, by detecting data drift, assigning weights, making update decisions, and evaluating performance, such that the online ML predicting model can adapt and optimize its performance over time. There is a need for a technical solution that will allow the online ML predicting model to improve its predictive accuracy and decision-making ability continually especially in a changing data environment by an iterative process of learning and then determining when an update of the online ML predicting model should be performed.

There is a need for a technical solution that will indicate the online fraud detection ML model when to perform the update based on incoming data points.

SUMMARY

There is thus provided, in accordance with some embodiments of the present disclosure, a computerized-method for determining when an update of an online fraud detection Machine Learning (ML) model is required.

Furthermore, in accordance with some embodiments of the present disclosure, the computer-implemented method may include: (i) receiving a batch of financial transactions data. Each financial transaction in the batch of financial transactions data may include one or more features; (ii) selecting a set of features from the one or more features by operating a feature engineering component; (iii) detecting a drift and a drift type in each feature in the selected set of features, by operating a drift detection model thereon; (iv) generating a batch-representation-vector of drift type for each feature in the selected set of features, each feature in the selected set of features is assigned a weight; (v) receiving a predicted-decision of update-needed by forwarding the generated batch-representation-vector to a trained Meta-based Decision Making (MetaBDMM) model. The predicted-decision of update-needed of the MetaBDMM model is based on a drift type of a preconfigured number of features in the selected set of features having highest assigned weight. The predicted-decision of update-needed is one of: (a) update-needed; and (b) update-not-needed, and (vi) forwarding the predicted-decision of update-needed to the online fraud detection ML model. When the predicted-decision of update-needed is update-needed, the online fraud detection ML model may perform an update and when the predicted-decision of update-needed is update-not-needed the online fraud detection ML model may not perform the update.

Furthermore, in accordance with some embodiments of the present disclosure, the MetaBDMM model updates the received batch with the predicted-decision of update-needed and stores it in a database of labeled and unlabeled batches of financial transactions.

Furthermore, in accordance with some embodiments of the present disclosure, training of the MetaBDMM model may include providing one or more labeled batches of financial transactions data. Each labeled batch may include: (i) batch-representation-vector of drift type for each feature in a selected set of features; and (ii) predicted-decision of update-needed, and each labeled batch is positively labeled or negatively labeled.

Furthermore, in accordance with some embodiments of the present disclosure, each updated batch may be positively labeled or negatively labeled based on performance metric of the online fraud detection ML model for the received batch.

Furthermore, in accordance with some embodiments of the present disclosure, the performance metric of the online fraud detection ML model for the updated batch, may be calculated by a comparison of predictions of the online fraud detection ML model for the updated batch and received client feedback as to the predictions of the online fraud detection ML model for the financial transactions in the updated batch, and the updated batch is positively labeled when there is a match between the predicted-decision of update-needed of the updated batch and the performance metric of the online fraud detection ML model for the updated batch and negatively labeled when there is no match between the performance metric of the online fraud detection ML model for the updated batch.

Furthermore, in accordance with some embodiments of the present disclosure, each feature in the selected set of features may be at least one indicative, informative, non-redundant, and non-correlated representative.

Furthermore, in accordance with some embodiments of the present disclosure, the drift type may be at least one of: (i) abrupt; (ii) gradual; (iii) cyclic; (iv) spike; and (v) none.

Furthermore, in accordance with some embodiments of the present disclosure, the drift detection model may be SeqDrift detector.

There is further provided a computerized-system for determining when an update of an online fraud detection Machine Learning (ML) model is required.

Furthermore, in accordance with some embodiments of the present disclosure, the computerized-system may include a database of labeled and unlabeled batches of financial transactions, a feature engineering component, a drift detection model, a trained MetaBDMM model, a memory to store the database of labeled and unlabeled batches and a processor.

Furthermore, in accordance with some embodiments of the present disclosure, the processor may be configured to (i) receive a batch of financial transactions data. Each financial transaction in the batch of financial transactions data includes one or more features; (ii) operate a feature engineering component to select a set of features from the one or more features of the financial transactions, (iii) detect a drift and a drift type in each feature in the selected set of features, by operating the drift detection model thereon; (iv) generate a batch-representation-vector of drift type for each feature in the selected set of features. Each feature in the selected set of features is assigned a weight; (v) receive a predicted-decision of update-needed by forwarding the generated batch-representation-vector to a trained Meta-based Decision Making (MetaBDMM) model. The predicted-decision of update-needed of the MetaBDMM model is based on a drift type of a preconfigured number of features in the selected set of features having highest assigned weight, and the predicted-decision of update-needed is one of: (a) update-needed; and (b) update-not-needed, and (vi) forward the predicted-decision of update-needed to the online fraud detection ML model. When the predicted-decision of update-needed is update-needed, the online fraud detection ML model performs an update and when the predicted-decision of update-needed is update-not-needed the online fraud detection ML model doesn't perform the update.

BRIEF DESCRIPTION OF THE DRAWINGS

FIGS. 2A-2B are a high-level workflow of a computer-implemented method for determining when an update of an online fraud detection Machine Learning (ML) model is required, in accordance with some embodiments of the present disclosure;

DETAILED DESCRIPTION

Figure 1A:
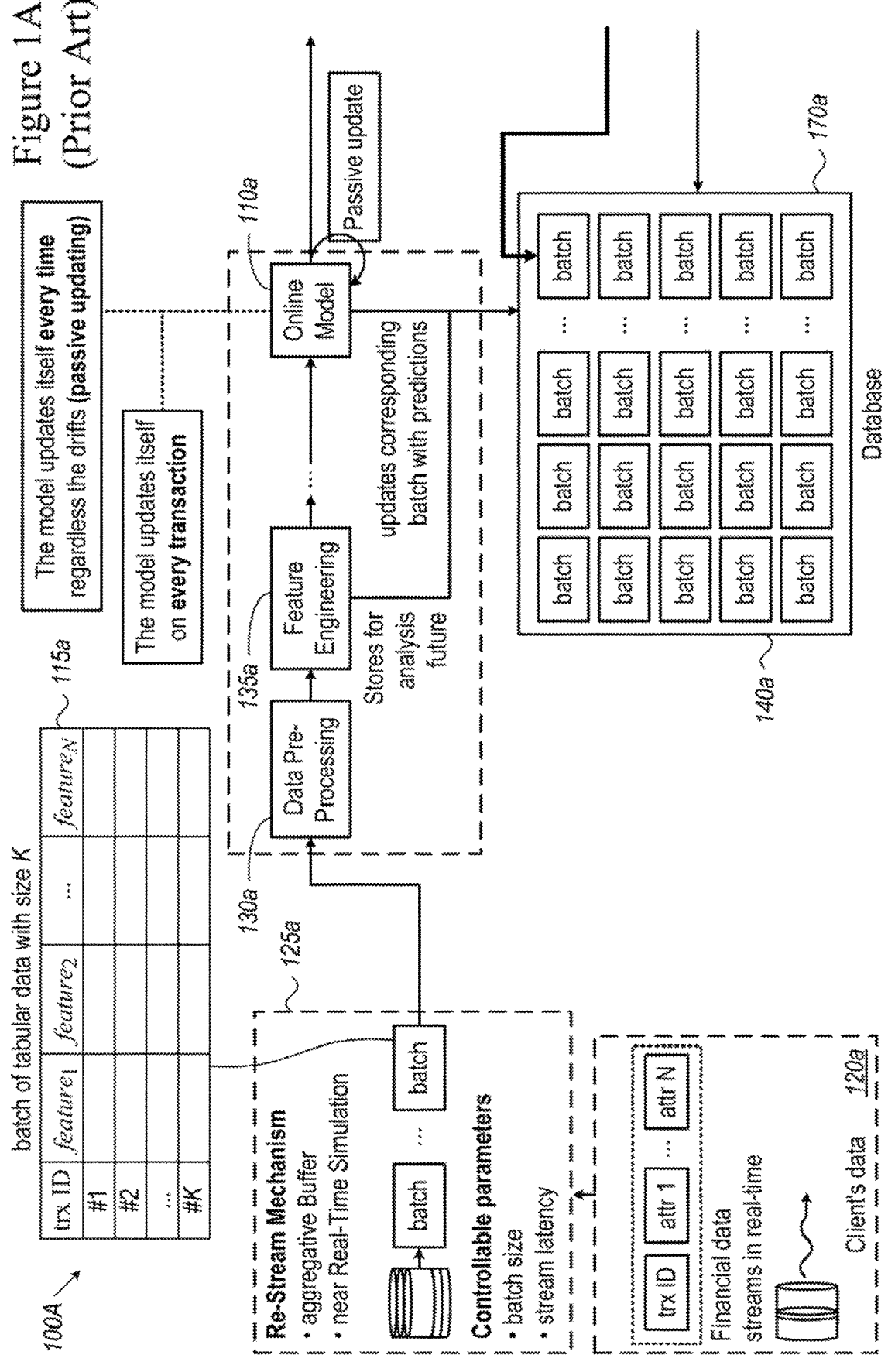
FIG. 1A schematically illustrates a high-level diagram of current solution architecture of a system for FinCrime prediction in real time as data is received.
Figure 1A:
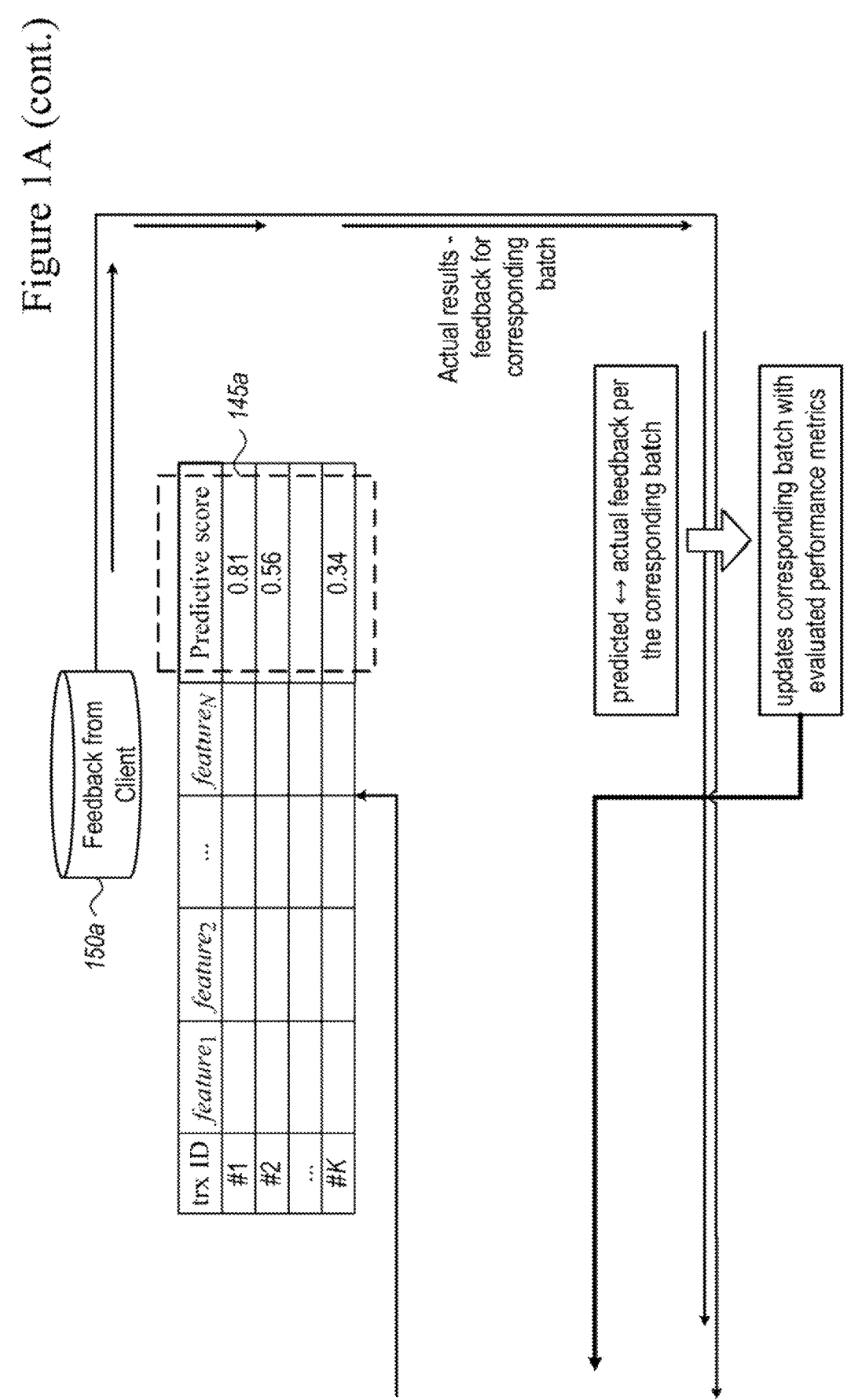

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Machine Learning (ML) models allow systems to automatically learn and improve from experience, which is achieved by training the algorithms on data. This training helps to create ML models that make predictions or decisions without being explicitly programmed to perform the task.

ML models are either trained on a labeled dataset in a supervised learning manner or trained to identify patterns and structures in an unlabeled data in an unsupervised learning manner. A semi-supervised learning approach combines elements of both supervised learning and unsupervised learning. There is a need for a technical solution to leverage these learning strategies, and to enhance their effectiveness in real-world, high-dimensional data settings.

Data drift is a phenomenon that occurs when the statistical properties of the target variable, which the online ML predicting model has to predict, change over time in unforeseen ways. The data drift leads to a decrease in the online ML predicting model accuracy. Data drift is a common challenge in many fields. Still, it's particularly problematic in online learning environments, where the ML model is expected to continuously learn and update from a stream of data in real-time. Data drift can occur due to several reasons. For example, it can result from changes in the environment where the data is being collected, also known as concept drift, or it could be due to changes in how the data is generated. Regardless of the cause, data drift presents a significant problem of an online ML predicting model becoming less accurate or utterly ineffective over time although performing well in the period right after its deployment can.

One of the primary challenges may be accurately detecting a data drift or concept drift in real time that requires the online ML predicting model to perform an update. Recognizing when the underlying data distribution has changed and requires an update of the online ML predicting model vs. a temporary change that doesn't require the update, is crucial for making informed decisions about the model updates.

Making decisions about updating online ML models involves an inherent uncertainty. Decision-making models must consider factors, such as the significance of observed drift, the impact of model updates on overall performance, and the potential risks of introducing instability. Incorporating uncertainty estimation techniques, probabilistic models, or reinforcement learning approaches may assist in addressing this challenge and enable informed decision-making as to the online ML predicting model updates.

Therefore, there is a need for a technical solution that will detect a data drift which may be of various types, e.g., gradual, abrupt, or intermittent that occurs in a feature in records in incoming data or in a combinations of features and determine when an update of an online fraud detection Machine Learning (ML) model is required, such that the online fraud detection ML model can make informed decisions when to update.

Meta-leaning algorithms aim to acquire knowledge or strategies from previous learning experiences and apply the acquired knowledge or strategies to new tasks or domains. Meta-learning approach plays a crucial role in enhancing the decision-making capabilities of a model. The meta-learning algorithm learns from past decision outcomes and their corresponding features, allowing it to identify patterns, relationships, and optimal decision strategies. It considers the meta-information derived from previous decision-making instances to guide its future decisions.

FIG. 1A schematically illustrates a high-level diagram 100A of current solution architecture of a system for Fin-Crime prediction in real time as data is received.

Financial crimes (FinCrime) encompass a broad range of illicit activities that can cause significant harm to businesses, consumers, and the economy. These activities include, but are not limited to, fraud, money laundering, embezzlement, tax evasion, and cybercrime. Fraud involves deceptive practices for personal or financial gain, including various types such as credit card fraud, insurance fraud, securities fraud, and more. Money laundering involves processes that criminals use to make illegally-gained proceeds appear legal, complicating tracing such funds.

Current systems use ML models for Anti Money Laundering (AML) procedures. These ML models, such as online model 110a can sift through vast data to identify patterns and anomalies that may indicate fraudulent activity. These systems, such as system 100A can flag suspicious financial transactions, detect patterns in financial transactions data, such as tabular data 115a that is linked to a known fraudulent behavior, and identify new patterns as they emerge.

Dynamic environments where data evolves continuously and new patterns appear in it, introduce limitations to the online ML predicting models, such as online model 110a because the data that the online ML predicting models receive online, is different than the data that the online ML predicting models have been trained on.

Currently, to overcome these limitations, a method in which data is used sequentially to continuously update the online ML predicting model is implemented. Online ML techniques enable the online ML predicting models to continue learning as new data arrives by updating themselves continuously. This process of update allows the system, such as system 100A to adapt to the new patterns and respond in real-time, i.e., provide accurate predictions.

Online machine learning systems require timely and efficient adaptation to changing data patterns. ML Models, such as online model 110a, need to update quickly and effectively to capture new patterns or mitigate the impact of data drift. Balancing the trade-off between timely updates and computational efficiency is a significant challenge, especially when dealing with large-scale or high-velocity data streams.

In FinCrime area, patterns and tactics continuously evolve, requiring systems which are implementing online ML predicting models, such as system 100A, to adapt promptly and accurately. Online ML predicting models hold an advantage as they learn from new incoming data and adapt their understanding of the underlying patterns in the data, ensuring a more accurate and up-to-date online ML predicting model.

Financial transactions which are generated on the client side 120a, are sent to a system that implements ML models for Anti Money Laundering (AML) procedures, such as system 100A. Each financial transaction is a multidimensional, heterogeneous vector containing various numerical and categorical attributes.

Within system 100A there is a re-streaming buffer component 125a which accumulates the incoming financial transactions and groups them into batches of a predefined size, commonly by a Subject Matter Expert (SBE). Each batch contains a certain number of transactions. These financial transactions represent tabular data e.g., table 115a, where each row in the table represents a financial transaction, and each column represents a feature i.e., attribute of the transaction.

The re-streaming buffer component 125a creates an artificial near-real-time data stream, enabling smooth and stable operation of the online ML model, e.g., online model 110a. The latency at which the re-streaming buffer component 125a sends the batches to the online ML system is also configurable by the SBE.

Before the ML online model, e.g., online model 110a receives a batch for prediction, the data in each batch may be pre-processed 130a and then forwarded to feature engineering 135a. During feature engineering 135a, feature vectors i.e., columns of attributes are extracted and further selected. Only the most significant, indicative, and informative features are selected for further machine learning development and data analysis. For example, the features may be payee, payor, branch number, transaction amount, address. The most important feature may be for example, amount of transferred money, device type and time of transaction.

An online ML model, such as online model 110a continuously updates itself, i.e., passive update, regardless presence, or absence of data drifting the data in the received batches. Additionally, the online model 110a updates itself for every datapoint, e.g., financial transaction within a batch. For instance, if a batch contains 500 transactions, the online ML model will update itself 500 times per batch. The online model 110a makes predictions per batch.

Each batch represents a table 115a where each row is a transaction, and each column is a feature. After online model prediction per each transaction, an additional column is created 145a. Each score represents a number from [0,1]. The higher the score value, the more probability that the transaction is fraudulent. This score is also known as regression score. Then, the final predictions 145a by the online model 110a are sent to the client.

Data pre-processing 130a stage in ML development involves preparing and transforming raw data for training a model. It includes steps such as cleaning the data, handling missing values and outliers, integrating data from different sources, transforming data into suitable formats, selecting or extracting relevant features, splitting the data into training, validation, and testing sets, and normalizing or standardizing the data to ensure consistent scales. These steps help improve data quality and set the foundation for better online model performance and generalization.

The feature engineering component 135a reduces the number of columns in the batches by a feature selection process. The feature selection leaves only indicative, informative, and essential features. Consequently, if a table or series of transactions in a batch consists of N columns, after feature engineering 135a it will be reduced and consist of N-M columns. All batches in the system 140a after feature engineering 135a will contain the same number of columns.

The process of feature selection for example, can reduce the number of columns in a table of transactions that initially contain more than 300 columns to 15 or 20 columns, which are features or attributes of the financial transactions.

When the client has their feedback 150a, which is actual results of the predictions of the online model 110a, these results are sent back to evaluate the performance of the online model 110a. The actual results are after analysis of transactions which has been predicted with a probability higher than a preconfigured threshold as fraud.

There is a comparison process between the predictions made by the online model 110a, which are stored in batches in a database 140a, and the actual results provided by the client. Evaluation performance calculates a confusion matrix, e.g., False positives, False negatives, True positives, True negatives and, based on that, calculates representative metrics such as F1-score, Accuracy, Precision, Area Under the ROC Curve (AUC), and others. After the comparison and calculation of the metrics, the corresponding batch is updated.

Figure 4:
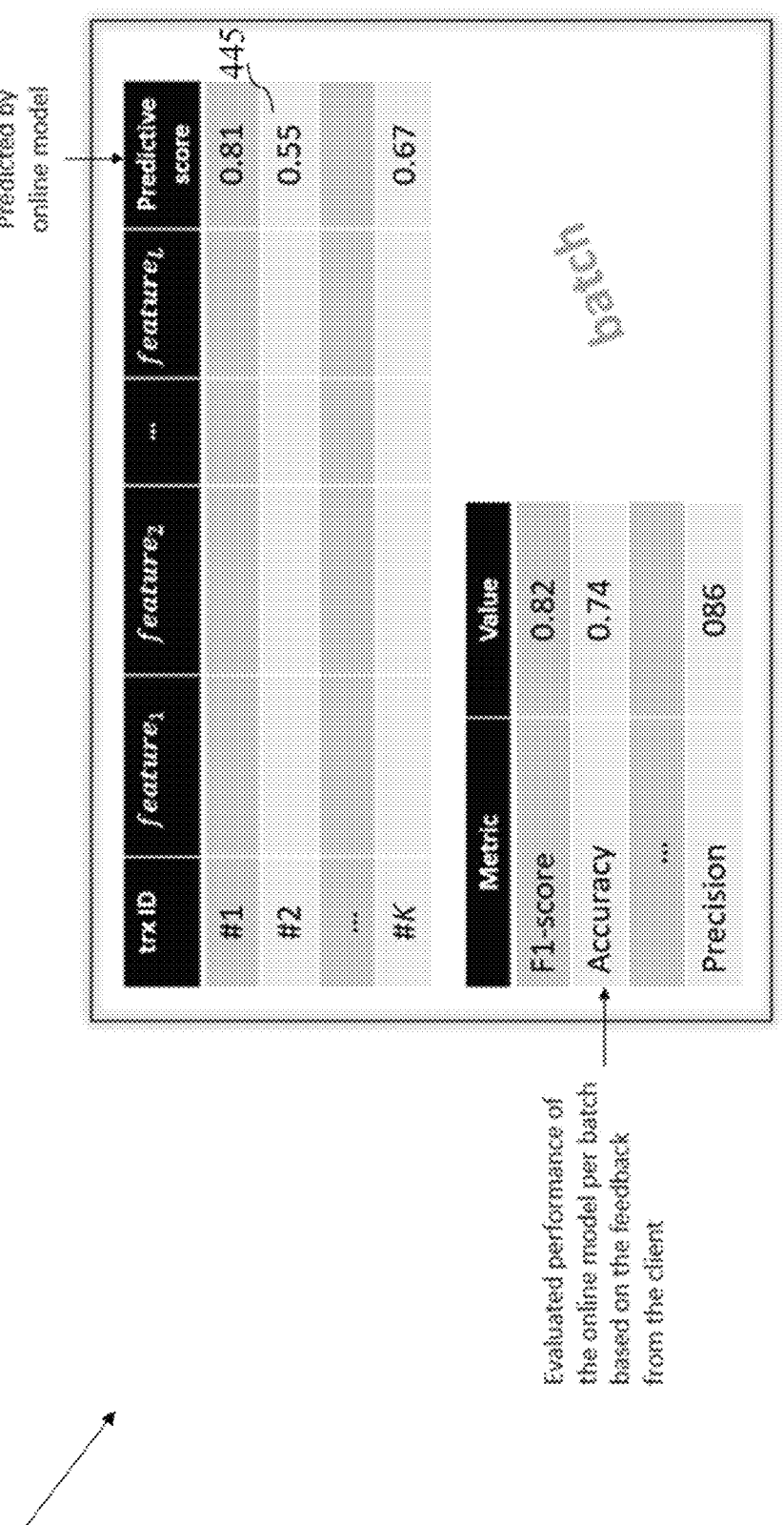
FIG. 4 illustrates examples of predictive scores by an online fraud detection ML mode and performance evaluation thereof.

The previous information of each batch's predictions by the online model 110a is no longer essential since it was stored only when the client received feedback to calculate performance of the online model 110a. Each batch contains performance metrics per entire batch and not per transaction. When there is an evaluation performance of the online model 110a, the entire batch with all transactions is compared with the feedback per this batch. Calculated metric assigned to the batch and represented batch performance, for example, as shown in FIG. 4.

Currently there are no ML decision-making models that determine whether to update online machine learning models, such as online model 110a. There are no decision-making models that leverage various factors, including data drift detection, feature importance, historical performance, and feedback from users or domain experts. Therefore, there is a need for decision-making models that aim to balance the benefits of updating the online ML model to capture new patterns and to reduce the potential risks of introducing instability or poor performance due to model passive updates.

Updating of the online predicting ML models too frequently can introduce instability and negatively impact their performance, while infrequent updates may cause these models to become outdated and less effective or accurate. Striking a balance between model stability and performance trade-offs is critical in maintaining accurate and reliable online models.

There is a need for a technical solution for adaptive learning rates, incremental updates, or ensemble methods to address this challenge by optimizing the update frequency of the online model and ensuring the online ML predicting model stability.

Moreover, online learning systems often operate in resource-constrained environments with limited computational resources or memory. Scaling models to handle large-scale data streams while considering resource constraints is a significant challenge. Developing algorithms and architectures that are computationally efficient, memory-efficient, and scalable is crucial to ensure the feasibility and practicality of online machine learning systems.

With passive updating of the online model 110a, as in system 100A, the online ML predicting model, e.g., online model 110a may not promptly adapt to changes in the data distribution. This can delay capturing new patterns or responding to evolving trends, potentially affecting the model's accuracy and performance. Passive updating may result in accumulated data drift, where the online ML predicting model, e.g., online model 110a may fail to adapt adequately over time. As the data drift accumulates, the model's predictions may become less accurate, reducing its effectiveness in real-time decision-making tasks.

Moreover, in passive updating, decision-making regarding the online ML predicting model updates is often reactive, relying on explicit triggers or thresholds. This can result in suboptimal decisions, as the model may not update until the drift has already caused significant deviations or performance degradation.

Updating an online model, i.e., the model is running in production environment, after prolonged periods of passive learning can be challenging. The accumulated data drift may require significant updates to the online model's parameters, potentially leading to more disruptive changes that require careful handling to maintain stability and avoid abrupt performance deterioration.

While passive updating of the online model 110*a*, assuming constant data drift all the time, may seem convenient, it has inherent limitations that hinder its efficiency. One primary concern is the high computational cost of continuously updating the online ML predicting model. e.g., 110*a* with each incoming data point, e.g., financial transaction. This process of continuously updating can be resource-intensive and time-consuming, and potentially slowing down the system's responsiveness and scalability.

In other words, passive updating of the online ML predicting model may lead to inefficient resource utilization. The online model 110*a* may require updates on a large scale, consuming significant computational resources and memory when adaptations are eventually triggered, which can strain the system's resources and impact overall performance.

There are detrimental effects and adverse consequences for passive updating of the online model 110*a*. First, without regular updates, the online model 110*a* may become outdated and less effective in detecting new and emerging types of financial crimes. Such online model 110*a* may fail to keep up with criminals constantly developing new techniques and strategies.

Second, an online model 110*a* that is updating passively may generate more false positives or false negatives. False positives can lead to unnecessary investigations and potential disruption to legitimate transactions, while false negatives can allow fraudulent transactions to go undetected.

Third, passive updating of the online model 110*a* can lead to inefficient allocation of resources. If the model is updated regularly, valuable resources may be well-spent on investigating false positives or missed opportunities to identify actual fraudulent transactions.

Fourth, an inadequate fraud detection due to passive updating of the online model 110*a* can damage the reputation of financial institutions and result in financial losses. Customers may need more confidence in the system's ability to protect their accounts, leading to potential attrition and decreased trust in the financial institution.

Given the dynamic nature of financial transactions and the continuous evolution of financial crimes, the capacity of an online ML predicting model to adapt to changes in incoming data is crucial. A paradigm shift in the ongoing battle against financial crime is required, opening up new possibilities for security, compliance, and risk management in the financial sector.

Alternative solutions to address the detrimental effects of passive updating include completely lack of updates. The disadvantages of this alternative solutions are the lack of model adaptability to evolving FinCrime patterns, inability to address emerging risks and new fraud techniques and increased vulnerability to sophisticated fraud attempts.

Alternative solutions to address the detrimental effects of passive updating which implement arbitrary or random updates suffer from inefficient allocation of computational resources, suboptimal model performance due to inadequate update selection and difficulty distinguishing relevant updates from noise.

Alternative solutions to address the detrimental effects of passive updating which implement reactive updates suffer from delayed response to emerging FinCrime trends, limited ability to proactively prevent fraud, reactive updates may lead to suboptimal model accuracy and failure to account for temporary or transient effects in emerging trends or drift.

Alternative solutions to address the detrimental effects of passive updating which are solely transaction-based suffer from inability to capture broader contextual information, failure to detect complex patterns involving multiple transactions and missed opportunities to identify sophisticated fraud networks.

Therefore, there is a need for a technical solution that may implement and timely and active update mechanism instead of a passive one. The needed technical solution should implement active updating strategies which may proactively monitor data drift in incoming data and employ adaptive learning rates, incremental learning techniques, or ensemble methods to enable timely and targeted updates of the online model. Moreover, the needed technical solution should implement active updating of the online model that allows for more flexible and responsive adaptation, mitigating the issues associated with passive updating.

Moreover, there is a need for a technical solution to handle data drift in incoming data for online ML predicting model, such that the online ML predicting model can better address the complexities of data drift in the incoming data by continuously performing informed updating rather than relying on passive updating of itself in real-time as new data arrives.

There is a need for a method for determining when an update of an online fraud detection Machine Learning (ML) model is required, especially in a limited computational resources environments or data streams with significant data drift.

Figure 1B:
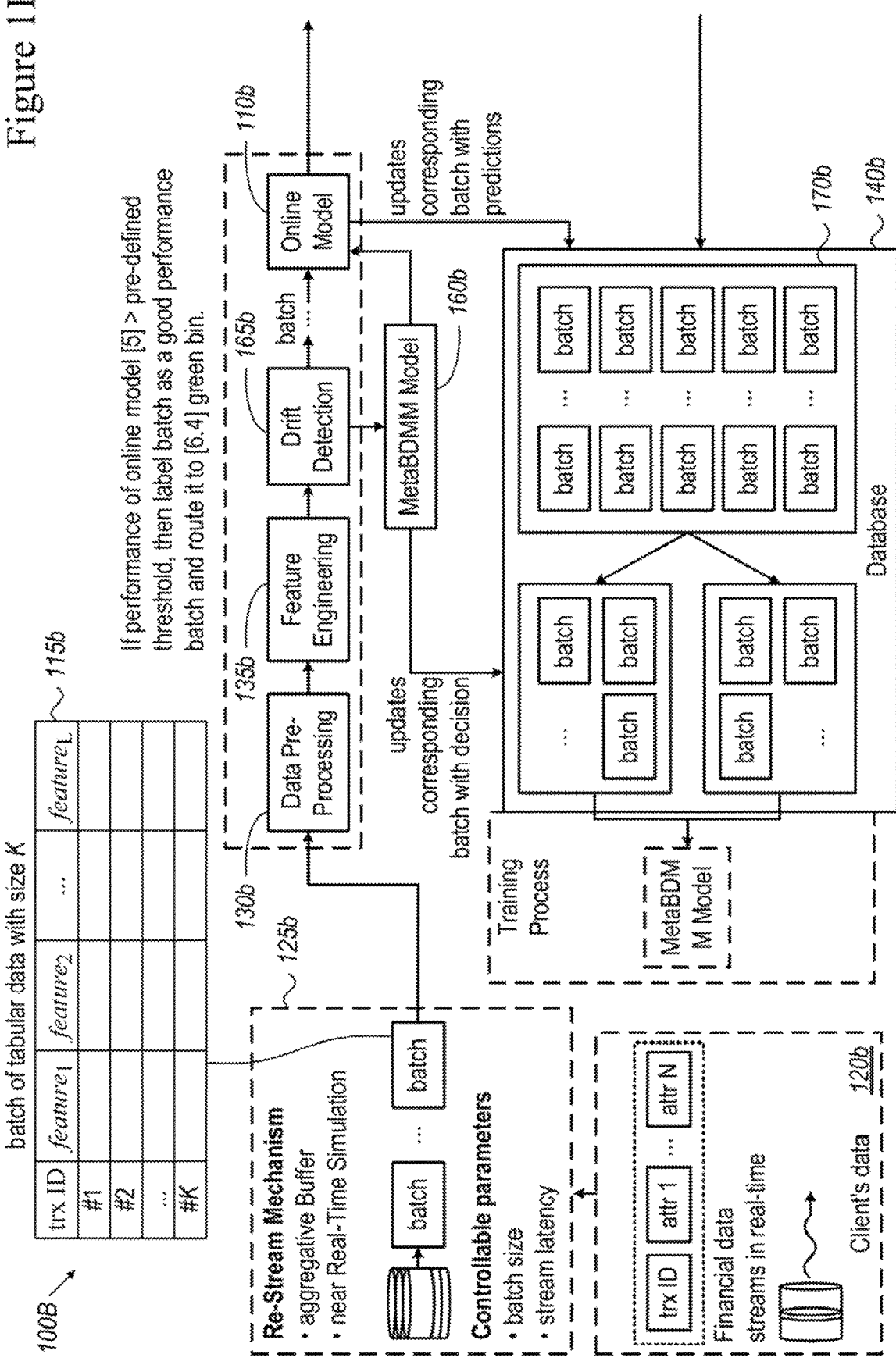
FIG. 1B schematically illustrate a high-level diagram of an architecture of a system for FinCrime prediction in real time as data is received, in accordance with some embodiments of the present disclosure.
Figure 1B:
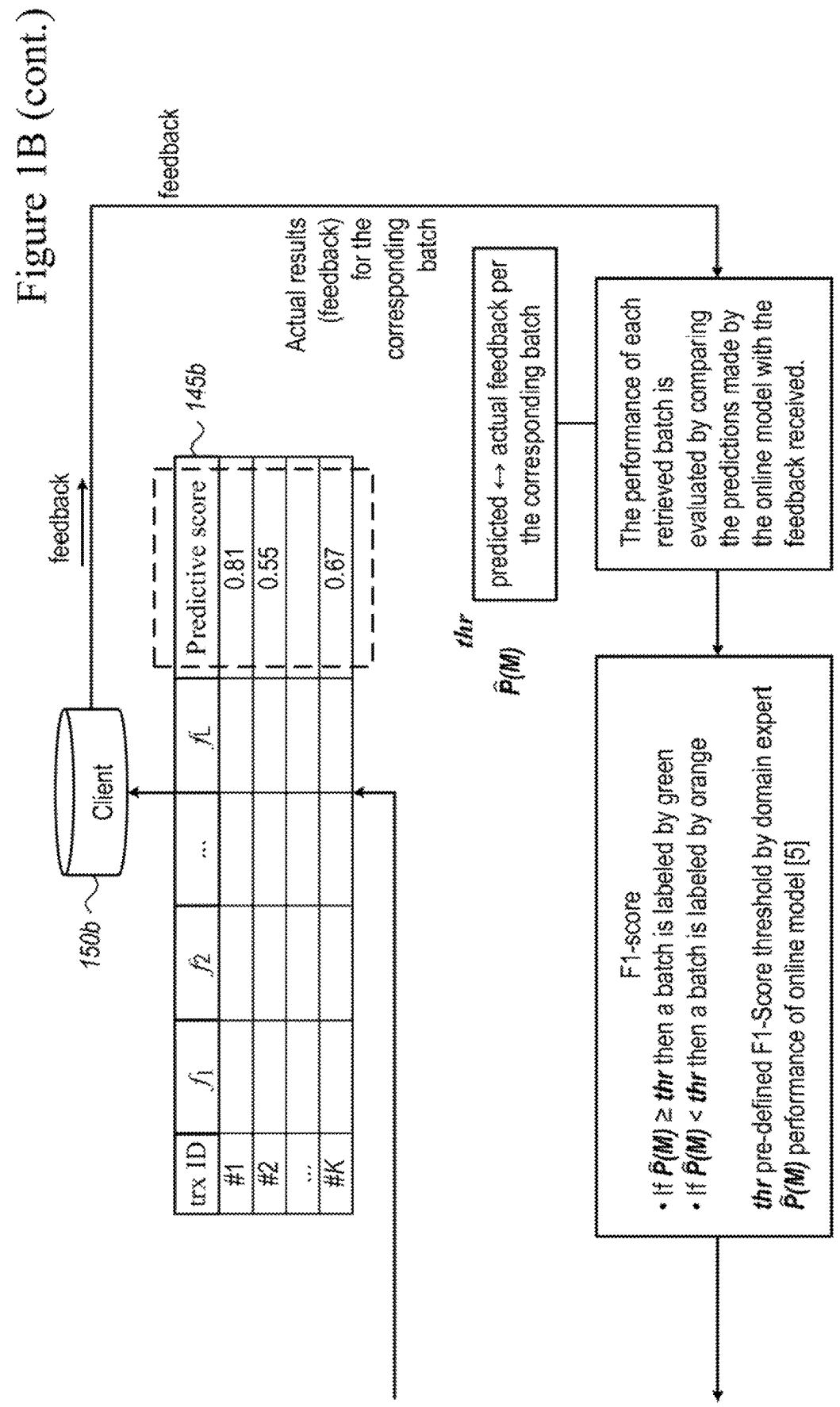

FIG. 1B schematically illustrates a high-level diagram 100B of an architecture of a system for FinCrime prediction in real time as data is received, in accordance with some embodiments of the present disclosure.

According to some embodiments of the present disclosure, a system, such as system 100B may respond effectively to data drifts in incoming data and save computational resources by updating the online model selectively, based on specific characteristics of the incoming data and current state of the online mode.

In online learning scenarios and data streams, two prevailing strategies have emerged for updating machine learning models; the passive and no update strategies. However, both approaches suffer from limitations that hinder their optimal performance. The passive update strategy needs more effective responsiveness to data drifts, leading to suboptimal updates and potential model degradation. On the other hand, the no-update strategy needs to adapt to evolving patterns in the data, resulting in outdated models that perform poorly in dynamic environments.

According to some embodiments of the present disclosure, system 100B provides an adaptive and nuanced approach to dynamically balance decision-making for the online model updating strategy. System 100B leverages intelligent decision-making elements to account for various factors inherent in the streaming data. In particular, it considers the presence of data drifts across the feature space of financial transactions, the correlation between data drifts and the importance of features, and the update strategy is applied not on a transaction but on a batch level. Furthermore, it incorporates the evaluation performance of the online model on a per-batch basis and a decision feature that represents the choice between an update or no update of the online model after each batch.

According to some embodiments of the present disclosure, system 100B provides a drift-aware intelligent decision-making framework for real-time online model updating strategy framework. It provides a robust and flexible mechanism for the online model updating in data streams. By overcoming the limitations of existing updating methods, the intelligent decision-making framework for real-time online model updating strategy framework, establishes a solid decision-making system capable of handling the challenges posed by data drift and accompanying meta-information.

According to some embodiments of the present disclosure, one key aspect of the intelligent decision-making framework for real-time online model updating strategy framework is its ability to make complex decisions based on a comprehensive set of factors. By considering the presence of data drifts and their correlation with feature importance, the framework ensures that updates are triggered only when necessary and relevant. This intelligent decision-making approach minimizes unnecessary updates of the online model and conserves computational resources, thereby addressing the concerns surrounding computational costs.

According to some embodiments of the present disclosure, the intelligent decision-making framework for real-time online model updating strategy framework of system 100B introduces a batch-level update strategy, which offers computational advantages compared to updating on a per-transaction basis. Updating the online model, such as online model 110b at the batch level reduces computational costs, and the framework becomes more scalable, making it suitable for real-time applications where computational resources are often constrained.

In addition to its adaptability and computational efficiency, the intelligent decision-making framework of system 100B incorporates a performance evaluation component that assesses the online model's effectiveness on a per-batch basis. This allows for continuous monitoring and optimization of the model's performance, ensuring it remains accurate and up-to-date.

Overall, the intelligent decision-making framework of system 100B significantly advances online learning and model updating. By providing a more nuanced, efficient, and effective method for updating ML models in the presence of data drift, new framework addresses the limitations of existing strategies and paves the way for improved decision-making in real-time applications.

In machine learning, feature importance refers to a technique used to determine the relative significance or contribution of different input features, also known as independent variables or predictors, in a predictive model. It helps understand which features strongly influence the model's predictions and which features are less relevant. The feature importance is determined by a feature engineering component, such as feature engineering 135b.

According to some embodiments of the present disclosure, unlike traditional ML models that are trained on a static dataset and then deployed without the ability to learn from new data, a system, such as system 100B, utilizes an online ML model, such as online model 110b, which allows the system 100B to learn from ongoing financial data streams continually in an effective and resource reduced manner.

According to some embodiments of the present disclosure, system 100B provides a drift-aware intelligent decision-making framework for real-time online model updating strategies. It leverages a batch-based feature representation approach, such as a batch of tabular data 115b to analyze the data and identify potential data drift across multiple features. By examining the time period covered by each batch of financial transactions 115b, a data drift may be detected for individual features over a preconfigured period. This information as to a data drift type in one or more features in the batch of financial transactions is then aggregated to generate a batch-representation-vector, e.g., a binary vector representing the presence or absence of drift across all features for all financial transactions within the batch. For example, as shown in element 650 in FIG. 6 and examples 700A in FIG. 7A.

According to some embodiments of the present disclosure, to make informed decisions about updating the online fraud detection ML model, the importance of each feature may be considered. A weighted binary feature vector may be generated, where the weight assigned to each value corresponds to the importance of the corresponding feature. In other words, each feature in the set of features is assigned a weight based on the feature importance and the highest preconfigured number of features are then taken into consideration. Based on this representation, a dichotomous decision is made at the batch level, indicating whether an update should be performed, by a trained model, such as Meta-based Decision Making (MetaBDMM) model 160b.

According to some embodiments of the present disclosure, feature importance e.g., highest preconfigured number of features, in machine learning is a way to rank the relevance of input features based on their impact on an ML model's predictions. In general, a feature is considered important if its presence significantly improves the ML model's performance, while its absence degrades the performance. The frequency with which a feature is used, especially in algorithms that involve splitting data, can also be an indicator of its importance. Another way to gauge the importance of a feature is by observing the magnitude of change it causes in the model's output when its values are altered, keeping other features constant.

According to some embodiments of the present disclosure, the ability of a feature to reduce uncertainty or impurity, such as entropy or Gini impurity, can be a measure of its importance. One common method to determine feature importance is permutation, where the values of one feature are randomly shuffled, and the degradation in the model performance is observed. Features that have a strong correlation with the target variable might also be considered important, but it's essential to remember that correlation does not imply causation.

According to some embodiments of the present disclosure, statistical tests can be employed to determine if the relationship between a feature and the target variable is significant. In cases where the primary model is complex and hard to interpret, surrogate models, like decision trees, can be trained on the predictions of the primary model to gain insights into feature importance. If multiple models, regardless of their architectures or algorithms, consistently rank a feature as important, it strengthens the case for its relevance.

According to some embodiments of the present disclosure, domain knowledge can sometimes provide insights into which features should inherently be important for a given problem, even before any algorithmic assessment.

According to some embodiments of the present disclosure, the feature importance is determined by the feature being indicative, informative, non-redundant, non-correlated representative. Indicative features are those features in the data that provide valuable information for making accurate predictions or decisions. These features play a crucial role in the online model's performance. When certain conditions like concept drift, non-stationarity, or heteroscedasticity occur on these indicative features, it can significantly impact the model's accuracy and effectiveness.

According to some embodiments of the present disclosure, system 100B which implements a drift-aware intelligent decision-making framework, aims to identify, and handle changes in data conditions, especially when they occur on the indicative features. By considering these indicative features, system 100B can make informed decisions about when to update the online model, such as online model 110b and when to avoid unnecessary updates, thus mitigating potential harmful effects caused by the changing data conditions.

According to some embodiments of the present disclosure, financial transactions which are generated on the client side 120b, are sent to a system that implements ML models for Anti Money Laundering (AML) procedures, such as system 100B. Each financial transaction is a multidimensional, heterogeneous vector containing various numerical and categorical attributes.

According to some embodiments of the present disclosure, system 100B includes components a re-streaming buffer component 125b, such as 125a in FIG. 1A, which accumulates the incoming financial transactions and groups them into batches of a predefined size.

According to some embodiments of the present disclosure, data pre-processing 130b stage includes preparing and transforming raw data for training a model. It includes steps such as cleaning the data, handling missing values and outliers, integrating data from different sources, transforming data into suitable formats, selecting or extracting relevant features, splitting the data into training, validation, and testing sets, and normalizing or standardizing the data to ensure consistent scales.

According to some embodiments of the present disclosure, feature engineering component 135b includes creating or transforming features in a dataset to enhance model performance. It includes leveraging domain knowledge, creating new features through mathematical operations, encoding categorical variables, scaling numeric features, reducing dimensionality, extracting time-series features, evaluating feature importance, performing feature selection to retain only important features, and iterating the process. Feature engineering uncovers patterns, improves accuracy, enables better generalization, and focuses on the most indicative features.

According to some embodiments of the present disclosure, informative features are attributes in the data that contain relevant and valuable information about the target variable or the prediction task at hand. These informative features contribute significantly to the learning process of the online model 110b and can lead to better generalization and performance.

According to some embodiments of the present disclosure, identifying informative features is crucial, as they are likely to be affected more by concept drift and other data stream changes. By actively monitoring and managing these informative features behavior, system 100B can ensure that the online model, such as online model 110b remains accurate and up-to-date, leading to better decision-making capabilities.

According to some embodiments of the present disclosure, non-redundant features refer to attributes that add unique and distinct information to the model, independent of other features. These features are valuable because they provide complementary insights, enhancing the model's learning capacity. System 100B which supports a decision-making framework, considering non-redundant features may become important when deciding whether to update the online model 110b. Redundant features may not contribute significantly to the online model's performance, but non-redundant features do. Thus, focusing on non-redundant features may help in prioritizing the online model updates effectively, especially during periods of changing data conditions.

According to some embodiments of the present disclosure, non-correlated features are attributes that show little to no statistical relationship with each other, while correlated features exhibit some degree of association or dependency.

According to some embodiments of the present disclosure, the online IL predicting model, such as online model 110b, that is running in production environment, should make informed decisions about updating or maintaining the online ML predicting model, such as online model 110b by analyzing features related to data drift, feature importance, historical decisions, and performance metrics.

According to some embodiments of the present disclosure, by leveraging meta-learning techniques, such as detecting data drift, assigning weights, making update decisions, and evaluating performance of the model, an online ML predicting model, such as online model 110b, may adapt and optimize its performance over time. This iterative process of learning and updating allows the online ML predicting model, such as online model 110b to improve its predictive accuracy and decision-making ability continually.

According to some embodiments of the present disclosure, by continually evaluating the performance of the online ML predicting model, comparing predicted outcomes with actual results, and storing metadata related to decision outcomes, the online ML predicting model can iteratively improve its decision-making abilities. The meta-learning process augments the decision-making feature space with performance metrics, enabling the algorithm to adapt its decision-making strategy based on historical performance.

According to some embodiments of the present disclosure, through this iterative feedback loop, the algorithm harnesses meta-learning techniques to refine its decision-making process over time. It becomes more adept at adapting to changing conditions, handling data drift, and making informed decisions that align with the underlying patterns and dynamics of the data. The meta-learning enhances decision-making by leveraging previous decision outcomes, incorporating meta-information, and continually learning and adapting its decision-making strategy. This leads to improved accuracy, reliability, and efficiency in decision-making tasks of the online ML predicting model.

According to some embodiments of the present disclosure, an incorporation of meta-learning principles into the online ML predicting model may empower it to efficiently handle dynamic and evolving data patterns. By leveraging previous learning experiences and performance evaluations of the online ML predicting model, the online ML predicting model, such as online model 110b, can make informed decisions about when and how to update itself. This timely update ensures that the online ML predicting model stays up-to-date and responsive to changes in the underlying data distribution, resulting in improved accuracy and reliability of the online model 110b.

According to some embodiments of the present disclosure, the batch of financial transactions data and its meta-information, including the batch-representation-vector, e.g., binary drift vector and the predicted-decision of update-needed, may be stored for further analysis and evaluation. After a decision is made, the online model 110b is informed if update-needed or not and accordingly either the online model is updated or left unchanged. Then, the online model 110b provides predictive scores for each transaction within the batch of financial transactions data, which are stored as metadata for performance evaluation purposes.

According to some embodiments of the present disclosure, the client feedback contributes to the assessment of the performance of the online model 110*b*. By comparing the predicted scores with the actual outcomes, the effectiveness of the online model 110*b* can be measured. Performance metrics are calculated and added to the batch metadata, enriching the information for subsequent iterations.

According to some embodiments of the present disclosure, the performance metric of the online fraud detection ML model for the updated batch may be calculated by a comparison of predictions of the online fraud detection ML model for the updated batch and received client feedback as to the predictions of the online fraud detection ML model for the financial transactions in the updated batch, and the updated batch may be positively labeled when there is a match between the predicted-decision of update-needed of the updated batch and the performance metric of the online fraud detection ML model for the updated batch and negatively labeled when there is no match between the performance metric of the online fraud detection ML model for the updated batch.

According to some embodiments of the present disclosure, an iterative process of collecting sufficient data to train the MetaBDMM model 160*b* may continue by positively and negatively labeling the updated batches. A positive label signifies an accurate prediction of update-needed, based on the online model 110*b* performance evaluation that is determined by customer feedback as to the prediction of each financial transaction in the batch of financial transactions, and a negative label signifies an inaccurate prediction of prediction of update-needed. For example, when the MetaBDMM model 160*b* has predicted that update of the online model 110*b* is needed and the performance evaluation of the online model 110*b* based on customer feedback is high than the batch will be positively labeled. In another example, when the updated batch includes an indication of update-not-needed but the online model 110*b* performance evaluation based on customer feedback is low the updated batch may be labeled as negative because the prediction of the MetaBDMM model 160*b* is wrong.

According to some embodiments of the present disclosure, the MetaBDMM model 160*b*, trained on augmented batch metadata, that includes the predicted-decision of update-needed to the online fraud detection ML model, becomes a decision-making engine as to future updates of the online model 110*c*. Based on the decision of the MetaBDMM model 160*b*, the online model 110*b* is updated or continues without modification. Predictive scores are generated for each transaction in the batch 145*b*, by online model 110*b*, ensuring continuous and up-to-date predictions.

According to some embodiments of the present disclosure, in a non-limiting example, MetaBDMM model 160*b*, may use a range of values to determine if an update of online model 110*b* is needed, the range may be from '3' to '100'. '3' may indicate that there is no need to update the online model 100*b*, and '100' may indicate that there is an urgency to update the online model 110*b*. A predicted-decision of update-needed by the trained Meta-based Decision Making (MetaBDMM) model may be provided by the values of drift type of each feature as in the generated batch-representation-vector and the importance of each feature as determined by the feature engineering component 135*b*.

Figure 3:
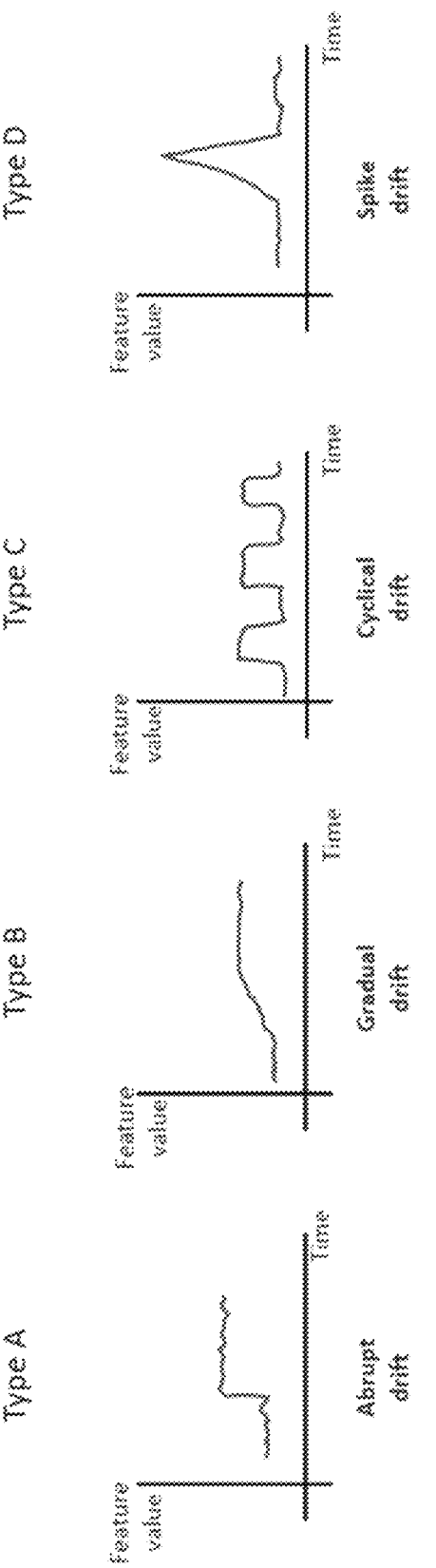
FIG. 3 shows data drift types, in accordance with some embodiments of the present disclosure.
Figure 7A:
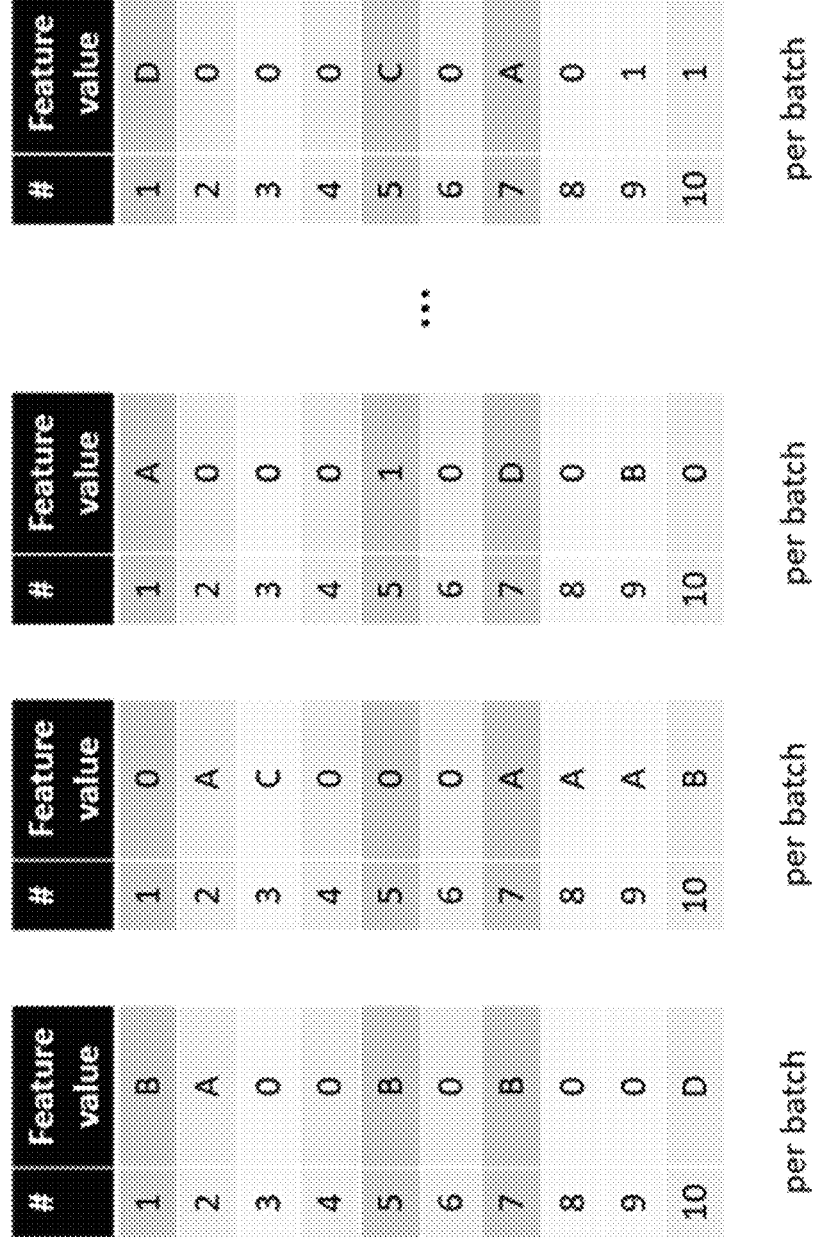
FIGS. 7A-7B shows examples of a batch-representation-vector of drift type for each feature in the selected set of features, in accordance with some embodiments of the present disclosure.

According to some embodiments of the present disclosure, in a non-limiting example, each data drift type, for example as shown in FIG. 3, may be attributed a value such as, data drift type 'A' equals '4' data drift type 'B' equals '5' and when there is no data drift '1'. Each selected feature in the set of features e.g., 10 features, as shown in FIG. 7A, may be attributed a value that indicates its importance or weight as to the update of online model 110*b*, such as feature 'F1' and feature 'F2' equal '2' and feature 'F3' equal '5'. All other features, 'F4'-'F10' each equal '1'. i.e., has been assigned a weight of '1' by the feature engineering component. Therefore, when the preconfigured number of features in the selected set of features having highest assigned weight has been set to three, then features 'F1', 'F2' and 'F3' may be taken into account for the predicted decision of update-needed by the MetaBDMM model 160*b*.

According to some embodiments of the present disclosure, when features 'F1' and 'F2' has been determined as having drift type 'A' and feature 'F3' may have been determined as having no data drift in the batch and is indicated as such in the generated batch-representation-vector then. MetaBDMM model 160*b* may operate the following weighted sum: 'F1'*4÷'F2'*4÷'F3'*1=2*4+2*4+5*1=21. The weighted sum may be compared to a threshold, such as '70' and any weighted sum above it may provide a predicted decision of update-needed and any weighted sum equal or below it may provide a predicted decision of update-not-needed.

According to some embodiments of the present disclosure, system 100B significantly advances financial crime detection. By harnessing the power of Artificial Intelligence (AI), online ML, and decision theory, system 100B delivers a highly efficient, real-time detection and prevention of financial crime.

According to some embodiments of the present disclosure, the drift detection model 165*b* implements concept drift detection. Various statistical and machine learning techniques have been employed to detect real-time data drift or concept drift. These techniques involve monitoring features, tracking statistical properties of the data, or using ensemble methods to compare predictions with ground truth labels. Examples include the Drift Detection Method (DDM), Adaptive Windowing (ADWIN), and Early Drift Detection Method (EDDM), as described in U.S. Pat. No. 11,531,903.

According to some embodiments of the present disclosure, by implementing the drift detection model 165*b* to each incoming batch of data, the presence of data drift may be identified and a vector that captures the potential values for each feature in a selected set of features may be derived, e.g., batch-representation-vector of drift type.

According to some embodiments of the present disclosure, in cases where no data drift is detected, a value of '0' may be assigned to the corresponding feature in the generated batch-representation-vector. However, if a data drift is identified, rather than a simple binary indication of its existence, the drift detection model 165*b* may provide the specific type of drift that has been recognized such as A, B, C, or D, as shown in detail in FIG. 3. The recognized types of data drift allow for a more nuanced and informative representation of the identified drifts, offering insights into the distinct nature of the observed changes.

According to some embodiments of the present disclosure, the drift detection model 165*b* may be implemented by utilizing a SeqDrift detector. The SeqDrift detector monitors sequential patterns in the data and identifies a data drift when the observed patterns significantly deviate from the expected behavior. Unlike other drift detectors that primarily focus on detecting changes in statistical measures or distance metrics, the SeqDrift detector specifically aims to capture and characterize the sequential patterns in the data. By doing so, it can provide indications of the nature or type of the observed drift. The SeqDrift detector analyzes the sequential relationships between data points, such as financial transactions, and compares them to a reference or expected pattern. If there are significant deviations in the observed sequences, it signals the occurrence of data drift.

According to some embodiments of the present disclosure, this capability makes the SeqDrift detector particularly useful when the nature of the data drift is not just a statistical shift but involves changes in the sequential patterns or dependencies in the data stream. By identifying such changes, the SeqDrift detector can help gain insights into the underlying dynamics and potential causes of the observed data drift.

According to some embodiments of the present disclosure, the Meta-based Decision Making (MetaBDMM) model 160b may be implemented by online learning algorithms. Online learning algorithms are specifically designed for online ML models and have been developed to handle evolving data streams. These algorithms, such as Online Gradient Descent, Online Random Forests, or online Support Vector Machines (SVM), update the online model 110b incrementally as new data arrives, allowing for efficient adaptation to changing data patterns. The update of the online model 110b incrementally means batch by batch and not on a bunch of batches one time as in traditional machine learning, with intention not to wait for entire data to be accumulated, and start the training process batch by batch.

According to some embodiments of the present disclosure. Reinforcement Learning techniques for decision-making have been utilized to train decision-making models, such as MetaBDMM model 160b, that determine when to update online models, such as online model 110b. These models learn from feedback, rewards, or user interactions to make optimal decisions regarding model updates. Reinforcement learning algorithms, such as Q-learning, Deep Q-Networks (DQN), or Proximal Policy Optimization (PPO), may be applied in system 100B.

According to some embodiments of the present disclosure, Bayesian methods may be employed for online learning and data drift detection. Techniques like Bayesian Online Changepoint Detection or Bayesian Networks allow for probabilistic modeling of data drifts and to facilitate decision-making based on posterior probabilities.

According to some embodiments of the present disclosure, ensemble learning techniques, such as stacking or boosting, may be utilized in system 100B to combine multiple models or predictions for decision-making regarding updates of the online model 110b. These methods leverage the collective knowledge of diverse models or predictions to enhance the robustness and accuracy of decision-making.

According to some embodiments of the present disclosure, meta-learning techniques may be applied in online settings, as in system 100B, to learn how to adapt models, such as online model 110b efficiently and effectively to new tasks or changing data distributions. Online meta-learning algorithms leverage previous learning experiences to guide model updates and decision-making, facilitating faster adaptation and improved performance.

Figure 1C:
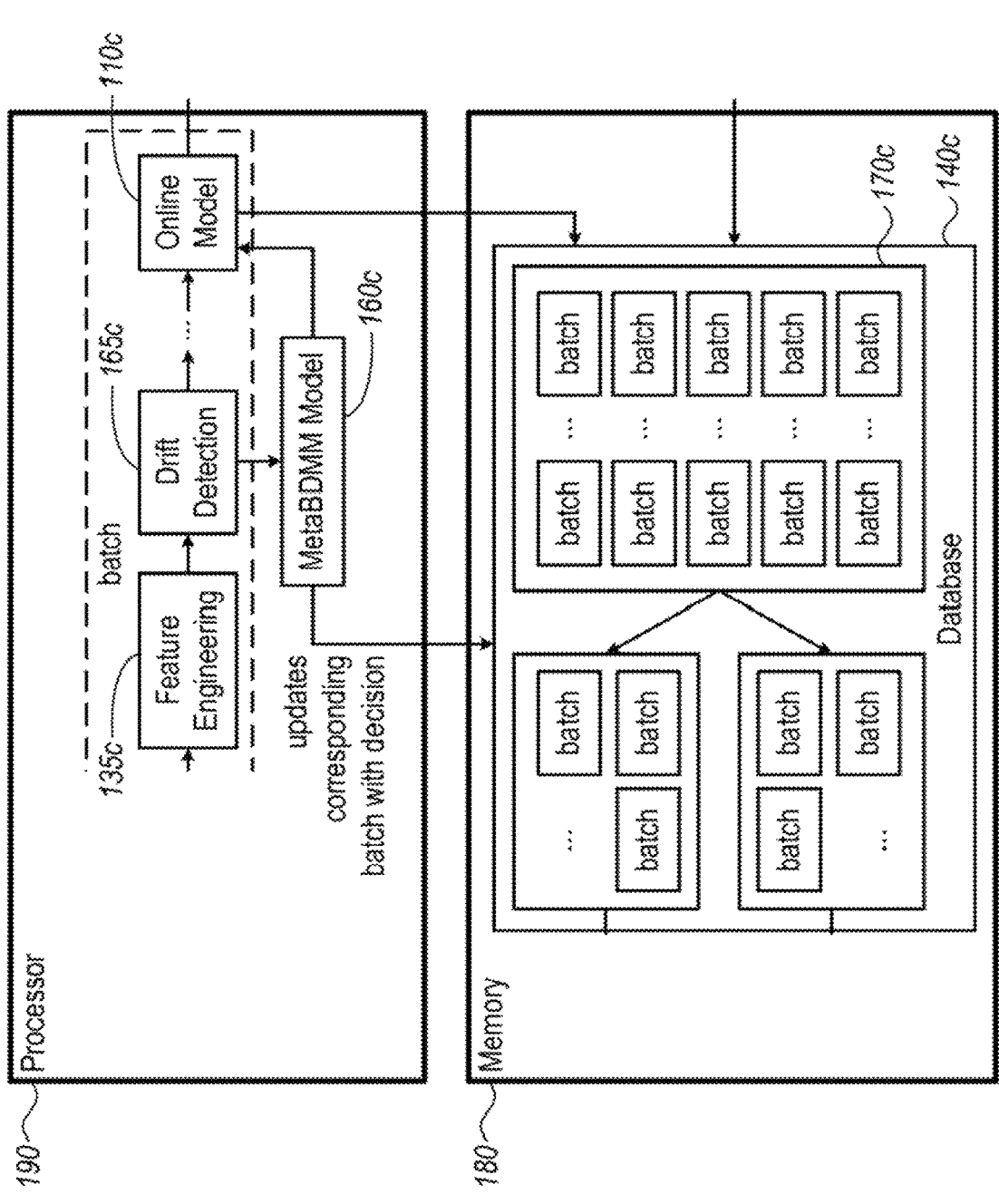
FIG. 1C schematically illustrates a high-level diagram 100C of computerized-system for determining when an update of an online fraud detection Machine Learning (ML) model is required, in accordance with some embodiments of the present disclosure.

FIG. 1C schematically illustrates a high-level diagram of computerized-system 100C for determining when an update of an online fraud detection Machine Learning (ML) model is required, in accordance with some embodiments of the present disclosure.

According to some embodiments of the present disclosure, a system, such as system 100C may be implemented in system 100B in FIG. 1B.

According to some embodiments of the present disclosure, the computerized-system 100C for determining when an update of an online fraud detection Machine Learning (ML) model is required may include a database of labeled and unlabeled batches of financial transactions 140c, such as database of labeled and unlabeled batches of financial transactions 140b in FIG. 1B, a feature engineering component 135c, such as feature engineering component 135b, in FIG. 1B, a drift detection model, such as drift detection model 165b in FIG. 1B, a trained MetaBDMM model, such as MetaBDMM model 160c, and such as MetaBDMM model 160b in FIG. 1B, a memory 180 to store the database of labeled and unlabeled batches; and a processor 190.

According to some embodiments of the present disclosure, the processor 190 may be configured to receive a batch of financial transactions data, for example as shown in batch of tabular data with size k 115b in FIG. 1B. Each financial transaction in the batch of financial transactions data includes one or more features.

According to some embodiments of the present disclosure, the processor 190 may operate a feature engineering component 135c, such as feature engineering component 135b in FIG. 1B to select a set of features from the one or more features of the financial transactions. Then, the processor may detect a drift and a drift type in each feature in the selected set of features, for example, as shown by element 640 in FIG. 6, by operating the drift detection model 165c thereon. The drift detection model may be SeqDrift detector.

According to some embodiments of the present disclosure, the drift type may be at least one of: (i) abrupt; (ii) gradual; (iii) cyclic; (iv) spike; and (v) none, as shown in FIG. 3.

Figure 6:
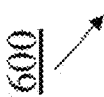
FIG. 6 illustrates generation of a batch-representation-vector of drift type for each feature in the selected set of features, in accordance with some embodiments of the present disclosure.

According to some embodiments of the present disclosure, a batch-representation-vector of drift type for each feature in the selected set of features may be generated, for example as shown by element 650 in FIG. 6. Each feature in the selected set of features may be assigned a weight.

According to some embodiments of the present disclosure, a predicted-decision of update-needed may be received by forwarding the generated batch-representation-vector to a trained Meta-based Decision Making (MetaBDMM) model, such as MetaBDMM model 165c, and such as MetaBDMM model 165b in FIG. 1B.

According to some embodiments of the present disclosure, the predicted-decision of update-needed of the MetaBDMM model may be based on a drift type of a preconfigured number of features in the selected set of features having highest assigned weight, and the predicted-decision of update-needed is one of: (a) update-needed; and (b) update-not-needed.

According to some embodiments of the present disclosure, the predicted-decision of update-needed may be forwarded to the online fraud detection ML model, such as online model 110c in FIG. 1C and such as online model 110b in FIG. 1B.

According to some embodiments of the present disclosure, when the predicted-decision of update-needed is update-needed, the online fraud detection ML model performs an update and when the predicted-decision of update-needed is update-not-needed the online fraud detection ML model doesn't perform the update.

According to some embodiments of the present disclosure, the MetaBDMM model 160c, such as MetaBDMM model 160*b* in FIG. 1B may update the received batch with the predicted-decision of update-needed and may store the updated batch in a database of labeled and unlabeled batches of financial transactions 140*c*, such as database 140*b* in FIG. 1B.

According to some embodiments of the present disclosure, training of the MetaBDMM model 160*c* may include providing one or more labeled batches of financial transactions data to the MetaBDMM model 160*c*, each labeled batch includes: (i) batch-representation-vector of drift type for each feature in a selected set of features; and (ii) predicted-decision of update-needed, and each labeled batch may be positively labeled or negatively labeled.

According to some embodiments of the present disclosure, each updated batch may be positively labeled or negatively labeled based on a performance metric of the online fraud detection ML model for the received batch.

According to some embodiments of the present disclosure, the performance metric of the online fraud detection ML model for the updated batch may be calculated by a comparison of predictions of the online fraud detection ML model, e.g., online model 110*c* for the updated batch and the received client feedback as to the predictions of the online fraud detection ML model, e.g., online model 110*c* for the financial transactions in the updated batch.

Figure 8A:
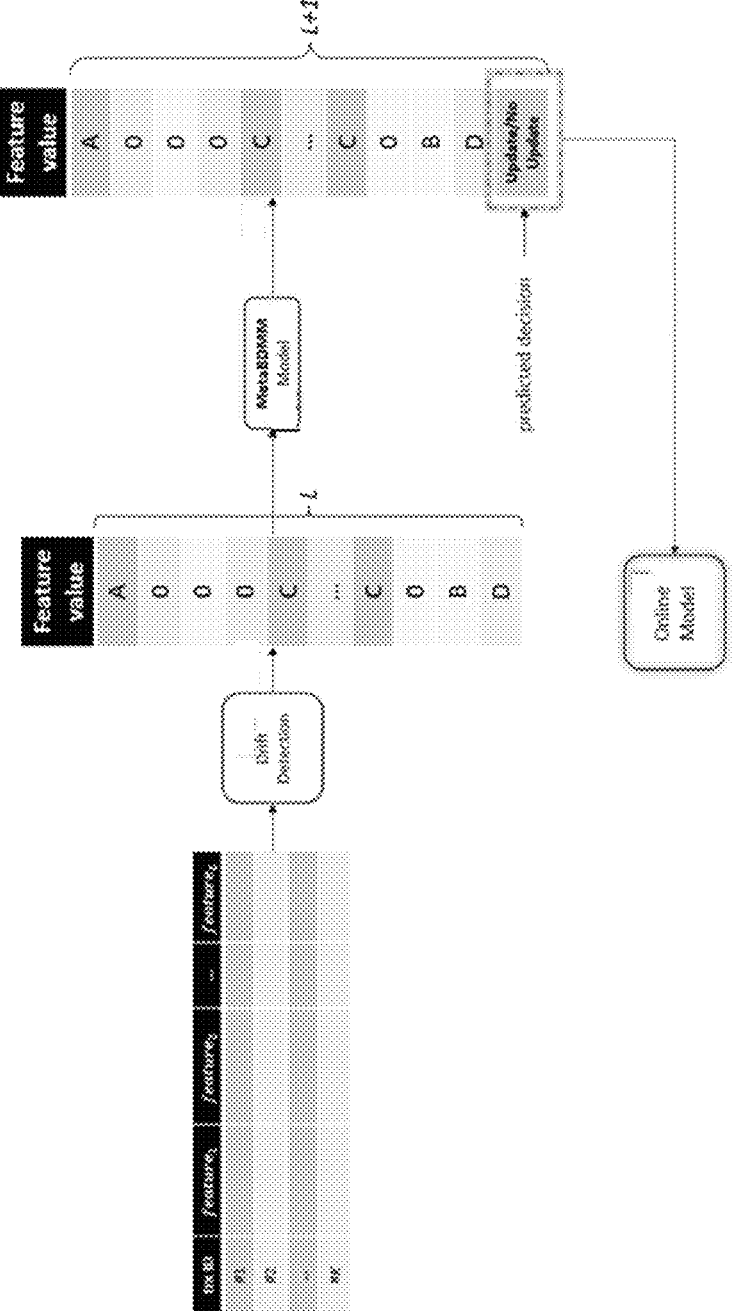
FIGS. 8A-8B show a batch-representation-vector of drift type for each feature in the selected set of features with a predicted decision by a trained Meta-based Decision Making (MetaBDMM) model, in accordance with some embodiments of the present disclosure.
Figure 8B:
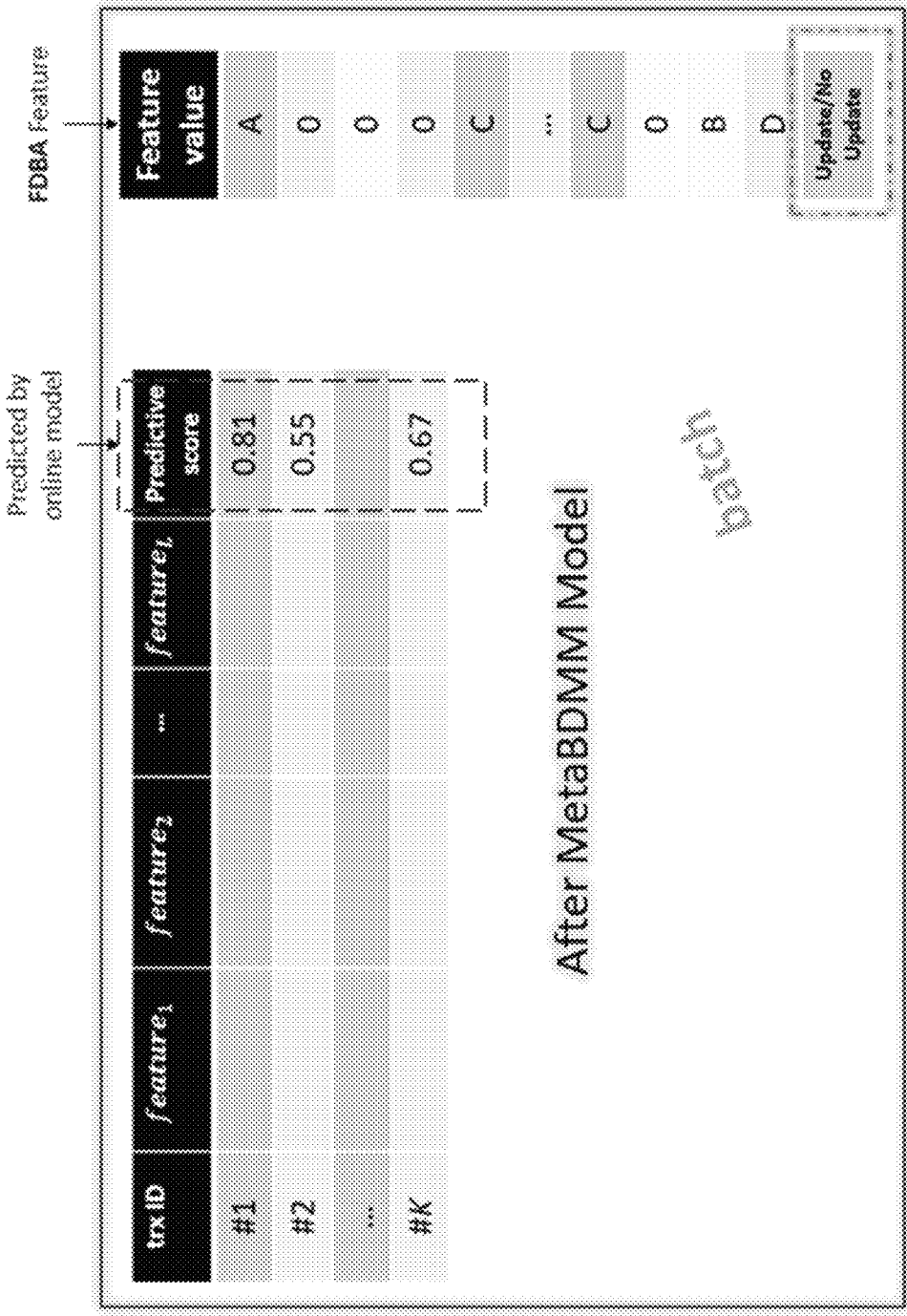

According to some embodiments of the present disclosure, the updated batch may be positively labeled when there is a match between the predicted-decision of update-needed of the updated batch and the performance metric of the online fraud detection ML model for the updated batch and negatively labeled when there is no match between the performance metric of the online fraud detection ML model for the updated batch, as shown in FIGS. 8A-8B.

According to some embodiments of the present disclosure, each feature in the selected set of features is at least one of indicative, informative, non-redundant, and non-conelated representative. The prediction of the MetaBDMM model 160*c* is based each feature importance as determined by the feature engineering component 135*c* and the weight assigned to each data drift type of each feature in the batch-representation-vector or non-existence of the data drift.

According to some embodiments of the present disclosure, in a non-limiting example, MetaBDMM model 160*c*, may use a range of values to determine if an update of online model 110*c* is needed, the range may be from '3' to '100'. '3' may indicate that there is no need to update the online model 100*b*, and '100' may indicate that there is an urgency to update the online model 110*c*. A predicted-decision of update-needed by the trained Meta-based Decision Making (MetaBDMM) model 160*c* may be provided by the values of drift type of each feature as in the generated batch-representation-vector, e.g., as shown in FIG. 7A and the importance of each feature as determined by the feature engineering component 135*c*.

According to some embodiments of the present disclosure, in a non-limiting example, each data drift type, for example as shown in FIG. 3, may be attributed a value such as, data drift type 'A' equals '4' data drift type 'B' equals '5' and when there is no data drift '1'. Each selected feature in the set of features e.g., 10 features, as shown in FIG. 7A, may be attributed a value that indicates its importance or weight as to the update of online model 110*b*, such as feature 'Fl' and feature 'F2' equal '2' and feature 'F3' equal '5'. All other features, 'F4'-'F10' each may equal '1', i.e., has been assigned a weight of '1' by the feature engineering component 135*c*. Therefore, when the preconfigured number of features in the selected set of features having highest assigned weight has been set to three, then features 'F1', 'F2' and 'F3' may be taken into account for the predicted decision of update-needed by the MetaBDMM model 160*c*.

According to some embodiments of the present disclosure, when features 'F1' and 'F2' has been determined as having drift type 'A' and feature 'F3' may have been determined as having no data drift in the batch and is indicated as such in the generated batch-representation-vector then, MetaBDMM model 160*c* may operate the following weighted sum: 'F1'*4+'F2'*4+'F3'*1=2*4+ 2*4+5*1=21. The weighted sum may be compared to a threshold, such as '70' and any weighted sum above it may provide a predicted decision of update-needed and any weighted sum equals or below it may provide a predicted decision of update-not-needed by the MetaBDMM model 160*c*.

FIGS. 2A-2B are a high-level workflow of a computer-implemented method for determining when an update of an online fraud detection Machine Learning (ML) model is required, in accordance with some embodiments of the present disclosure.

According to some embodiments of the present disclosure, operation 210 comprising receiving a batch of financial transactions data. Each financial transaction in the batch of financial transactions data includes one or more features of the financial transactions.

According to some embodiments of the present disclosure, operation 220 comprising selecting a set of features from the one or more features by operating a feature engineering component.

According to some embodiments of the present disclosure, operation 230 comprising detecting a drift and a drift type in each feature in the selected set of features, by operating a drift detection model thereon.

According to some embodiments of the present disclosure, operation 240 comprising generating a batch-representation-vector of drift type for each feature in the selected set of features, each feature in the set of features is assigned a weight.

According to some embodiments of the present disclosure, operation 250 comprising receiving a predicted-decision of update-needed by forwarding the generated batch-representation-vector to a trained Meta-based Decision Making (MetaBDMM) model. The predicted-decision of update-needed of the MetaBDMM model is based on a drift type of a preconfigured number of features in the selected set of features having highest assigned weight. The predicted-decision of update-needed is one of: (a) update-needed; and (b) update-not-needed.

According to some embodiments of the present disclosure, operation 260 comprising forwarding the predicted-decision of update-needed to the online fraud detection ML model. When the predicted-decision of update-needed is update-needed, the online fraud detection ML model performs an update and when the predicted-decision of update-needed is update-not-needed the online fraud detection ML model doesn't perform the update.

FIG. 3 shows data drift types, in accordance with some embodiments of the present disclosure.

According to some embodiments of the present disclosure, different types of data drift can have varying impacts on the performance and accuracy of machine learning models, such as online model 110*b* in FIG. 1B and such as online model 110*c* in FIG. 1C. By identifying the specific type of drift, it becomes possible to make informed decisions on how to handle the data drift and adapt the online model accordingly. Enlisting the types of data drifts allows for a more comprehensive understanding of the potential changes occurring in the streaming data.

Some common types of data drifts include Abrupt e.g., sudden Drift represents a sudden and significant change in the data distribution. This can occur due to sudden shifts in user behavior, changes in external factors, or system failures. Gradual drift e.g., incremental Drift refers to a slow and continuous change in the data distribution over time. This type of data drift can be challenging to detect since the changes occur gradually rather than abruptly. Cyclical e.g., recurring Drift involves recurring patterns or cycles in the data distribution. It occurs when the underlying data exhibits periodic variations or seasonal trends, which can impact the online model's performance if not properly handled. Spike Drift occurs when there is a temporary, short-lived deviation or spike in the data distribution. It represents a sudden and significant increase or decrease in certain features or target variable values, which may or may not be sustained over time.

According to some embodiments of the present disclosure, data drift of type A, B, C and D are examples that highlight the inefficiency of a passive updating strategy by an online machine learning model, such as online model 110a in FIG. 1A, resulting in unnecessary computational resource utilization and associated costs.

According to some embodiments of the present disclosure, data drift of type A shows an abrupt drift where a spike in data may be observed within a short period. When an online model, such as online model 110a in FIG. 1A interprets this spike as a data drift and performs a self-update, it may not be an efficient decision since the data quickly returns to its previous behavior. Consequently, the online model would have to perform another self-update once it recognizes the data drift occurring again.

According to some embodiments of the present disclosure, when there is a drastic data drift that stabilizes over a long period before transitioning back into another drift then, if the online machine learning model is not updated to adapt to the new data behavior resulting from the data drift, the online model will underperform when the new behavior becomes the norm. A lack of an appropriate decision-making strategy for updating the model could result in financial losses and jeopardize the organization's reputation.

Data drift of type B shows a data drift that persists for a certain period of time, a gradual drift. If this period is sufficiently long, a self-update of the online model is a reasonable decision. However, if the time period is short, it resembles the scenario of data drift of type A. In such cases, the online model would need to perform two self-updates: one when it detects the drift and another when the drift concludes, and the data behavior reverts to its previous statistics.

Unlike a sudden spike, as shown in type D, this gradual drift is not immediately noticeable but can have a notable impact there is a risk of performance degradation. Such degradation could lead to financial losses, especially if the gradual drift persists for an extended duration.

Data drift of type C shows a cyclic drift demonstrates a similar behavior to data drift type A, but with two spikes occurring. If the online model is reactive and performs passive updates, it would need to update itself four times: upon identifying the first spike as a drift, when the first spike ends, when the second spike begins, and when the second spike concludes, all interpreted as separate instances of drift.

Accordingly, there is a need for a technical solution for decision-making regarding updating online machine learn-ing models. Such technical solution is shown in system 100B in FIG. 1B and in system 100C in FIG. 1C. Failing to address these data drifts, as existing solutions do, can lead to deteriorating performance of the online model, financial setbacks, and potential harm to the organization's reputation.

FIG. 4 illustrates examples of predictive scores by an online fraud detection ML mode and performance evaluation thereof.

According to some embodiments of the present disclosure, an online fraud detection Machine Learning (ML) model, such as online model 110b, in FIG. 1B and such as online model 110c in FIG. 1C, may provide a predictive score for each financial transaction in a batch of transactions.

According to some embodiments of the present disclosure, the performance of the online model 110b and online model 100c in FIG. 1C may be evaluated per batch based on feedback from the client as to the predictive score of each financial transaction. For example, when the online model 110b in FIG. 100B or the online model 110c in FIG. 100C has provided a predictive score above a preconfigured threshold which means that the transaction is fraudulent, but an analysis of the client has found that it was not fraud, then it means that the performance of the online model 110b in FIG. 1B should be improved.

Figure 5:
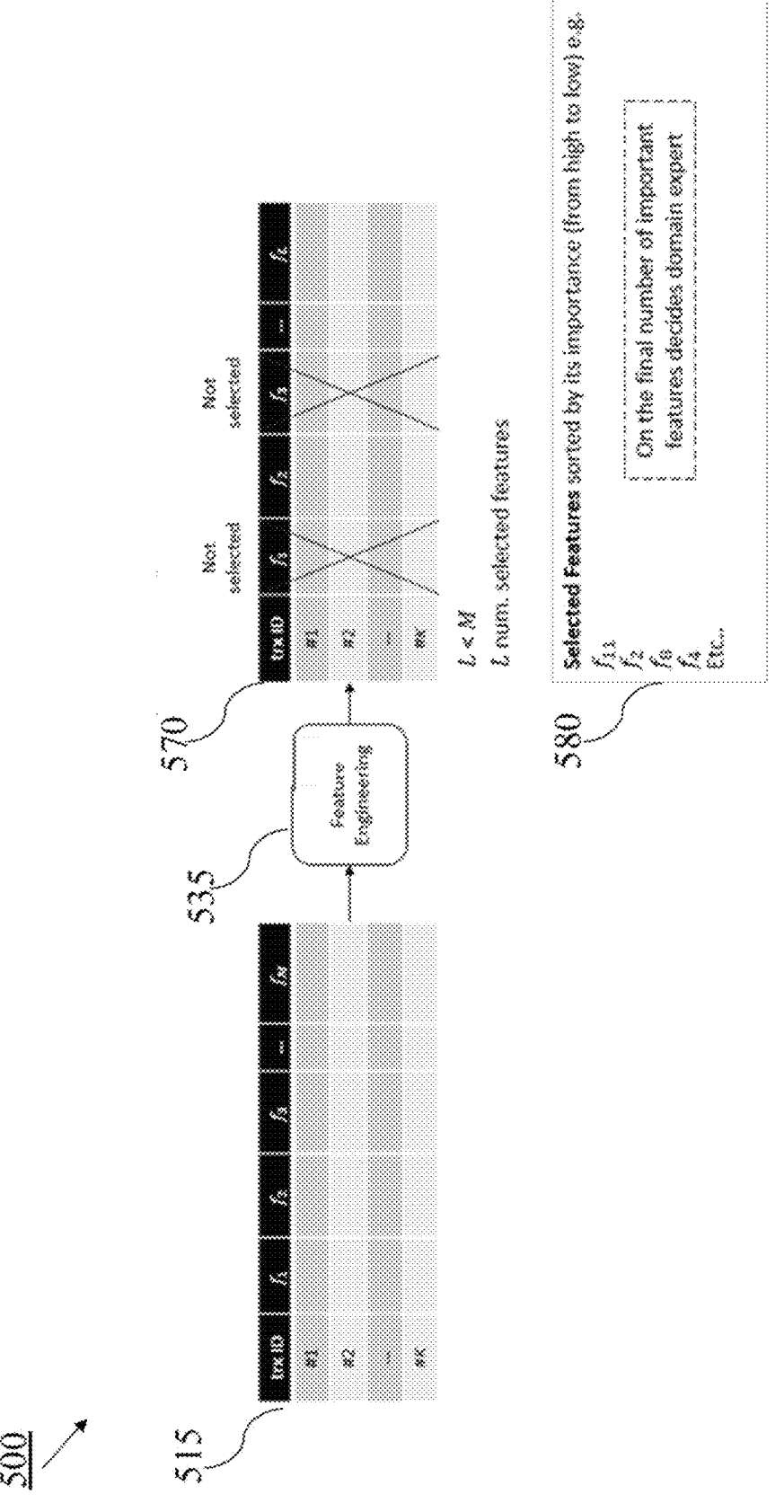
FIG. 5 illustrates a feature engineering process of a batch of financial transactions data, in accordance with some embodiments of the present disclosure.

FIG. 5 illustrates a feature engineering process of a batch of financial transactions data, in accordance with some embodiments of the present disclosure.

According to some embodiments of the present disclosure, feature engineering component 535, such as feature engineering 135a in FIG. 1A and such as feature engineering 135b in FIG. 1B and such as feature engineering 135c in FIG. 1C provides a detailed examination and evaluation of the available features 515 to identify the most relevant and informative features for the performance of the online model, such as online model 10b in FIG. 1B and such as online model 110c in FIG. 1C. The feature selection 570 is to enhance the online model's performance and interpretability, ensuring that it focuses on the most influential and meaningful aspects of the data.

According to some embodiments of the present disclosure, the understanding of the occurrence of data drift on important features carries greater significance compared to less important features due to their impact on the online model's performance. Important features are typically selected 580 based on their strong correlation or relevance to the target variable or desired outcomes. As a result, any data drift observed in these important features can have a more profound effect on the online model's predictions and decision-making.

According to some embodiments of the present disclosure, when an important feature experiences a data drift, for example a shown in FIG. 3, it implies a potential shift in the underlying patterns or relationships that the online model has learned. This information becomes highly indicative of changes in the target variable's behavior, or the dynamics of the problem being modeled. In contrast, data drift on less important features may have a relatively smaller impact on the online model's overall performance, as these features are considered to have lesser influence on the target variable.

According to some embodiments of the present disclosure, by focusing on data drift in important features, insights may be gained into the critical factors that significantly affect the online model's predictions. This knowledge enables a system, such as system 100B to make more informed decisions regarding the online model updates or adjustments to better align with the changing patterns in the important features. Consequently, understanding data drift on important features enhances the ability to capture and adapt to the most influential aspects of the data, leading to improved predictive accuracy and decision-making capabilities.

According to some embodiments of the present disclosure, the process of feature importance evaluation operates in a "dark mode" while real-time or historical data is fed into the online model 110*b* in FIG. 1B or online model 110*c* in FIG. 1C for prediction. Simultaneously, feature evaluation techniques are applied to assess the significance of each feature, analyzing its impact on the online model's performance. Once the evaluation is completed, the online model is deployed to the production environment, utilizing the gained insights to optimize its decision-making capabilities. This approach provides a comprehensive and refined feature selection process, enabling system 100B in FIG. 1B and system 100C in FIG. 1C to be implemented effectively in real-world applications.

According to some embodiments of the present disclosure, the data utilized originates solely from a known client, rather than a mix of multiple clients. This distinction allows to have prior knowledge of the specific attributes, e.g., features associated with each transaction from this client, such as payee, payor, branch number, transaction amount, address, and more. These features remain consistent throughout the entire process of working with the client, and their importance is preserved, enabling reliable analysis and decision-making.

FIG. 6 illustrates generation of a batch-representation-vector of drift type for each feature in the selected set of features, in accordance with some embodiments of the present disclosure.

According to some embodiments of the present disclosure, during model development, such as online model 10*b*, in FIG. 1B development, and such as online model 110*c* in FIG. 1C, the importance of features may be determined, for example, as shown by element 580 in FIG. 5 and this feature importance remains unchanged until the online model undergoes re-design or retraining.

According to some embodiments of the present disclosure, the order of the features is consistent across all batches of data. For example, if the three most important features out of a total of 10 are identified as features 3, 8, and 9, this order will be maintained throughout the process. Consequently, when examining the binary features indicating the presence or absence of drift, the positions of features 3, 8, and 9 will consistently represent the importance of those features, with a value of '0' or drift type per batch. As new batches arrive, the data drift type may change for each feature, but the relative order of importance for features 3, 8, and 9 will remain consistent.

According to some embodiments of the present disclosure, a drift occurrence and a drift type 640 in each feature in the selected set of features 630, by operating a drift detection model, such as drift detection model 165*b* in FIG. 1B and such as drift detection model 165*c* in FIG. 1C.

According to some embodiments of the present disclosure, a batch-representation-vector 650 of drift type for each feature in the selected set of features may be generated.

Figure 7B:
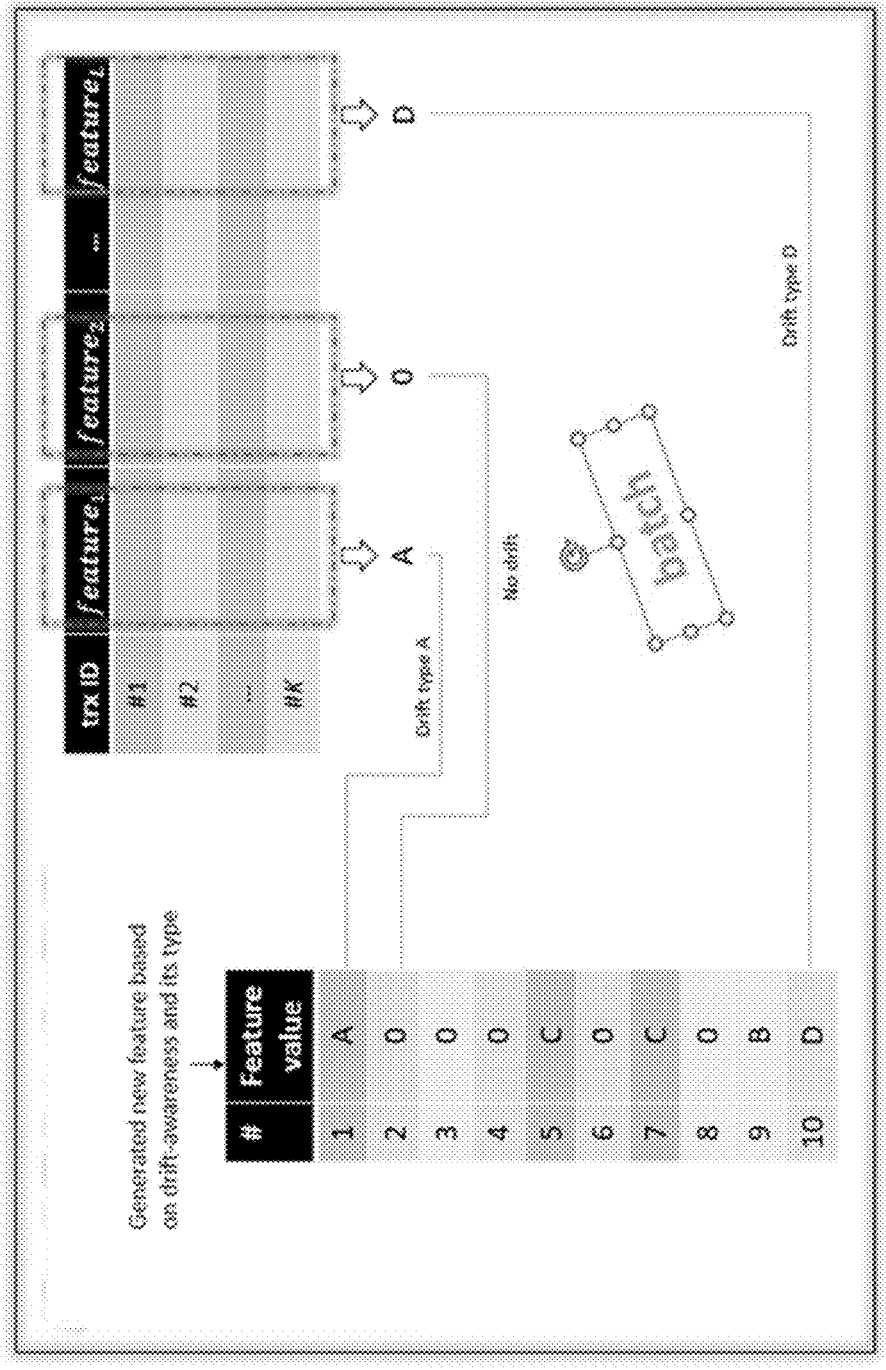

FIGS. 7A-7B shows examples of a batch-representation-vector of drift type for each feature in the selected set of features, in accordance with some embodiments of the present disclosure.

According to some embodiments of the present disclosure, the examples of batch-representation-vectors in FIG. 7A each includes ten features where three out of the ten have been designated as important features. The position of the important features remains consistent throughout the batch of financial transactions. This consistency is of utmost importance as it allows the MetaBDMM model 160*b* in FIG. 1B and the MetaBDMM model 160*c* in FIG. 1C, to effectively capture the underlying patterns and trends in the data. By generating these new features, the ability of the online model, such as online model 110*b* in FIG. 1B and online model 110*c* in FIG. 1C is enhanced to adapt and account for the evolving nature of the data drift, leading to improved performance and more accurate predictions.

According to some embodiments of the present disclosure, furthermore, the order and values of the important features hold significant informational and critical value. As previously mentioned, the order of important features, for example as shown by element 580 in FIG. 5, remains unchanged and is preserved across all batches throughout the entire process. The feature engineering component 135*b* in FIG. 1B and feature engineering component 135*c* in FIG. 1C assigns each batch with the designated important features. Once it is determined that the important features for the entire process are 3, 8, and 9, this assignment remains constant.

According to some embodiments of the present disclosure, important features and their associated drift, or lack thereof, carries substantial significance. Important features have the greatest impact on the online model, such as online model 110*b* in FIG. 1B and such as online model 110*c* in FIG. 1C, compared to other features with lower importance. The presence of data drift in an important feature itself carries significant implications. For instance, if a less important feature exhibits the same drift as a more important feature, it indicates that the final decision regarding whether to update the online model will consider the drift in the important feature more prominently, potentially leading to a decision favoring model updates. With numerous features, combinations, and considerations, this intricate landscape is captured by the MetaBDMM model 160*b* in FIG. 1B or MetaBDMM model 160*c* in FIG. 1C, during its training phase.

According to some embodiments of the present disclosure, the MetaBDMM model 160*b* in FIG. 1B and MetaBDMM model 160*c* in FIG. 1C may then leverage this understanding of the data's complexity to make informed decisions on whether to update the online model, such as online model 110*c* in FIG. 1C, based on the knowledge acquired from the accumulated data.

According to some embodiments of the present disclosure, after the batch undergoes drift detection in drift detection model 165*b* in FIG. 1B, or drift detection model 165*c* in FIG. 1C it is passed on to the online model 110*b* in FIG. 1B or online model 110*c* in FIG. 1C for transaction-level prediction within the batch. Each financial transaction is assigned a regressive score ranging from [0,1]. Higher scores indicate a higher probability of the financial transaction being a fraud, while lower scores indicate a lower probability of fraud.

According to some embodiments of the present disclosure, the online model, such as online model 110*b* in FIG. 1B and such as online model 110*c* in FIG. 1C, may not initiate the prediction process for the financial transactions in the batch until it receives a decision from the MetaBDMM model, such as MetaBDMM 160*b* in FIG. 1B and such as MetaBDMM 160*c* in FIG. 1C regarding whether to update itself or not. Once the online model, such as online model 110*c* in FIG. 1C receives this update signal, it may proceed to update itself accordingly. Only after the update (or non-update) is performed, the online model 110_b_ in FIG. 1B or online model 110_c_ in FIG. 1C may commence predicting the transactions within the batch.

According to some embodiments of the present disclosure, the incoming batch that just went through the drift detection model 165_b_ in FIG. 1B or drift detection model 165_c_ in FIG. 1C is added with the new generated feature end sent to the MetaBDMM model, such as MetaBDMM model 160_c_.

According to some embodiments of the present disclosure, the MetaBDMM model, such as MetaBDMM model 160_b_ in FIG. 1B and such as MetaBDMM model 160_c_ in FIG. 1C leverages the feature known as Feature Base Drift Awareness (FDBA) as shown in FIG. 7B, along with its corresponding type, to make predictions regarding whether to update the online model or not. These predictions are based on the FDBA values, which provide a comprehensive representation of the data drift within the batch for each feature.

According to some embodiments of the present disclosure, to facilitate the implementation of our innovative algorithmic framework, an algorithm, for example, such as the Support Vector Machine (SVM) may operate as a supervised learning algorithm. The objective of employing SVM is to effectively address our classification problem, specifically predicting whether the decision recommended by the MetaBDMM component should be "yes" or "no". This prediction is based on a high-dimensional vector known as the FDBA feature. Each dimension of this vector can assume values of 0, A, B, C, or D, as shown in FIG. 7A. A "yes" decision signifies the need for updating the online model 10_b_ in FIG. 1B, or online model 110_c_ in FIG. 1C while a "no" decision indicates that no updates are required for the online model 110_b_ in FIG. 1B or online model 110_c_ in FIG. 1C.

According to some embodiments of the present disclosure, SVM may be employed based on its suitability for addressing the classification problem at hand, considering factors such as the high-dimensional feature vector and the nature of the data.

According to some embodiments of the present disclosure, the decision regarding whether to update the online model, such as online model 110_b_ in FIG. 1B and such as online model 110_c_ in FIG. 1C or not to update is made at the batch level and not at the level of individual transactions.

FIGS. 8A-8B show a batch-representation-vector of drift type for each feature in the selected set of features with a predicted decision by a trained Meta-based Decision Making (MetaBDMM) model, in accordance with some embodiments of the present disclosure.

According to some embodiments of the present disclosure, after the online model, such as online model 110_b_ in FIG. 1B and such as online model 110_c_ in FIG. 1C has provided each transaction in the batch with a predictive score, it may send the updated batch with its new column "predictive score" that added to existing tabular data of transactions for example as shown by element 145_b_ in FIG. 1B.

According to some embodiments of the present disclosure, these data are stored in a dedicated section 170_b_ in FIG. 1B of the database 140_b_ in FIG. 1B. Section 170_b_ in FIG. 1B or Section 170_c_ in FIG. 1C, specifically represents the unlabeled batches, indicating that these batches have not yet received feedback from the client, and the performance of the online model on these batches is unknown.

According to some embodiments of the present disclosure, to train the MetaBDMM model, such as MetaBDMM

160_b_ in FIG. 1B, and such as MetaBDMM 160_c_ in FIG. 1C, labeled batches are required. These labeled batches provide information about the performance of the online model, indicating whether it performed well or poorly. Based on this information, the MetaBDMM model may incorporate the decision in the FDBA feature and forms a comprehensive understanding of the drift patterns across all features within the batch.

According to some embodiments of the present disclosure, by learning from this information, the MetaBDMM model aims to predict the best decision e.g., update or no update for new, unlabeled batches. The goal is to make predictions that maximize the chances of these batches being labeled as good performance in the future, once feedback is received from the client. This iterative learning process allows the MetaBDMM model to continuously improve its predictions and adapt to evolving data drifts.

According to some embodiments of the present disclosure, after the predictions by the online model, the results e.g., 145_b_ in FIG. 1B are sent to the client e.g., 150_b_ in FIG. 1B. The client handles the provided information, verifying its accuracy as it awaits the actual outcomes from the environment. This includes determining if a suspicious transaction is indeed fraudulent or not. Once the client gathers sufficient feedback, it sends it back to system 100B in FIG. 1B. System 100B in FIG. 1B then uses this feedback to fine-tune itself, accurately evaluate the performance of the online model 110_b_ in FIG. 1B, and subsequently make decisions regarding the performance of the MetaBDMM model 160_b_ in FIG. 1B. The MetaBDMM model 160_b_ in FIG. 1B is responsible for predicting the correct decision on whether to update the online model or not.

Figure 9:
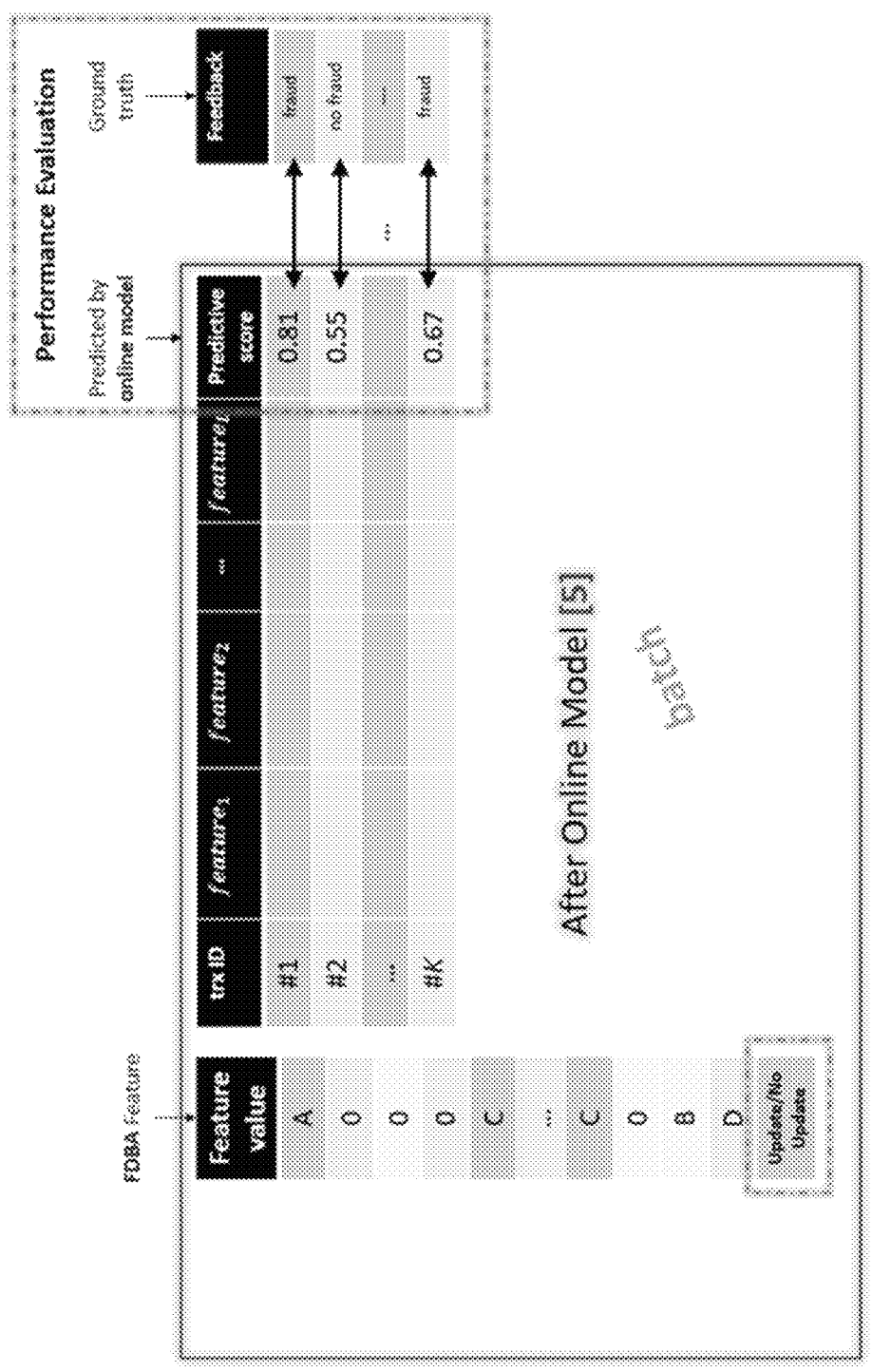
FIG. 9 illustrates performance evaluation of an online fraud detection ML model after an update due to an indication to update, in accordance with some embodiments of the present disclosure.

FIG. 9 illustrates performance evaluation of an online fraud detection ML model after an update due to an indication to update, in accordance with some embodiments of the present disclosure.

According to some embodiments of the present disclosure, the process of evaluating the performance of a retrieved batch, leveraging the batch ID associated with each feedback received from the clients. This evaluation entails comparing the predictions made by the online model, such as online model 110_b_ in FIG. 1B and such as online model 110_c_ in FIG. 1C with the corresponding feedback provided by the client. By analyzing the consistency and alignment between the online model's predictions and the client's feedback, valuable insights may be gained into the accuracy and effectiveness of the online model's performance on the specific batch. This evaluation step is of paramount importance as it serves as a crucial factor in refining and enhancing the model's predictive capabilities.

According to some embodiments of the present disclosure, during performance evaluation of the online model, a confusion matrix may be calculated. A confusion matrix is a table that summarizes the performance of a classification model by presenting the actual and predicted labels of a dataset. It allows us to evaluate the accuracy and effectiveness of a model's predictions.

According to some embodiments of the present disclosure, the confusion matrix may be structured as follows: True Positive (TP): The number of cases correctly predicted as positive by the model. These are the instances where the model correctly identifies the positive class. False Negative (FN): The number of cases that are actually positive but are incorrectly predicted as negative by the model. These are instances where the model fails to identify the positive class. False Positive (FP): The number of cases that are actually negative but are incorrectly predicted as positive by the model. These are the instances where the model incorrectly labels negative instances as positive. True Negative (TN): The number of cases correctly predicted as negative by the model. These are the instances where the model correctly identifies the negative class.

According to some embodiments of the present disclosure, the confusion matrix provides a comprehensive overview of the performance of the online model, such as online model 110b in FIG. 1B and such as online model 110c in FIGS. 1C and 1s especially useful for evaluating binary classification tasks. From the confusion matrix, various evaluation metrics can be derived, such as accuracy, precision, recall (sensitivity), specificity, and F1-score, which helps to assess the predictive capabilities and potential areas for improvement of the online model.

According to some embodiments of the present disclosure, for example, the performance evaluation process may include the following details. For transaction 1: the predictive score by the online model 110 in FIG. 1B is 0.81, which is larger than or equal to the threshold of 0.80. The feedback from the client confirms it as a fraud. Since the prediction and feedback both indicate fraud, it is considered a True Positive (TP). For transaction 2: the predictive score by the online model 110 in FIG. 1B is 0.55, which is less than the threshold. The feedback from the client also confirms it as a non-fraud transaction. As both the prediction and feedback agree on it being non-fraud, it is considered a True Negative (TN). For transaction 3, which is a random case: the predictive score by the online model 110 in FIG. 1B is 0.92, exceeding the threshold. However, the feedback from the client contradicts the prediction, classifying it as non-fraud. Hence, it is considered a False Positive (FP). For transaction 4: the predictive score by the online model 110 in FIG. 1B is 0.67, below the threshold. However, the feedback from the client indicates it as fraud. This creates a mismatch between the prediction and feedback, resulting in a False Negative (FN).

According to some embodiments of the present disclosure, for example, in a system, such as system 100B in FIG. 1B, the F1-score may be selected as a standard use case metric due to its advantageous properties i.e., its balanced consideration of precision and recall in binary classification tasks. The F1-score is a metric commonly used in binary classification tasks that combines precision and recall into a single measure, providing a balanced evaluation of the model's performance. The advantage of the F1-score lies in its ability to consider both false positives (FP) and false negatives (FN), ensuring that the model's performance is not biased towards either type of error. It provides a balanced assessment of the model's ability to correctly identify positive instances e.g., fraud transactions, while minimizing both false positives and false negatives.

According to some embodiments of the present disclosure, the formula for the F1-score is as follows:

$$F1\text{-score} = 2 * (\text{Precision} * \text{Recall}) / (\text{Precision} + \text{Recall})$$

whereby:

Precision is the ratio of true positives (TP) to the sum of true positives and false positives (TP+FP). It measures the accuracy of the positive predictions.

Recall is the ratio of true positives to the sum of true positives and false negatives (TP+FN). It measures the ability of the model to correctly identify positive instances.

According to some embodiments of the present disclosure, any other evaluation metric may be implemented in system 100B in FIG. 1B.

According to some embodiments of the present disclosure, system 100B in FIG. 1B maintains real-time prediction of transaction fraud using the online model 110b in FIG. 1B. The MetaBDMM model 160b in FIG. 1B serves as a predictive decision-making model, providing recommendations to the online model 110b in FIG. 1B on whether to update itself with each incoming batch. Furthermore, the framework generates labeled batches indicating the performance of both MetaBDMM 160b in FIG. 1B and the online model 110b in FIG. 1B on a given batch.

According to some embodiments of the present disclosure, it is assumed that labeled batches already exist, created through the execution of system 100B in FIG. 1B in a "dark mode" or "shallow mode". Dark mode or shallow mode is a mode when the model runs, and predicts, but it is not in production or live environment yet. This preliminary phase allows for the generation of labeled batches that signify the effectiveness of MetaBDMM 160b in FIG. 1B and the online model 110b in FIG. 1B on different batches.

According to some embodiments of the present disclosure, "dark mode" refers to a deployment strategy where a model is running and making predictions in a production-like environment, but its outputs are not used for actual decision-making. Instead, the predictions are observed and evaluated for performance and compared against known or expected outcomes. In dark mode, the model operates in the background, receiving live or historical data and producing predictions. These predictions are typically logged or monitored without being directly integrated into the decision-making process. The purpose is to assess the performance of the model, such as MetaBDMM model 160b in FIG. 1B, evaluate its accuracy, and validate its predictions against ground truth or expert judgment.

According to some embodiments of the present disclosure, dark mode allows for a thorough evaluation of the model's behavior and performance in a real-world setting. It enables monitoring of prediction quality, detection of any unexpected issues or biases, and assessment of the model's ability to generalize well to new data. By running the model in dark mode, potential issues can be identified and addressed before fully deploying the model for active decision-making. Once the performance and reliability of the model, such as MetaBDMM model 160b in FIG. 1B and such as MetaBDMM model 160c in FIG. 1C have been verified through dark mode evaluation, it can be confidently deployed in production, where its predictions are utilized in making critical decisions. Dark mode serves as an important intermediate step to ensure that the model is performing as intended and meets the required performance standards before going fully operational.

Figure 10:
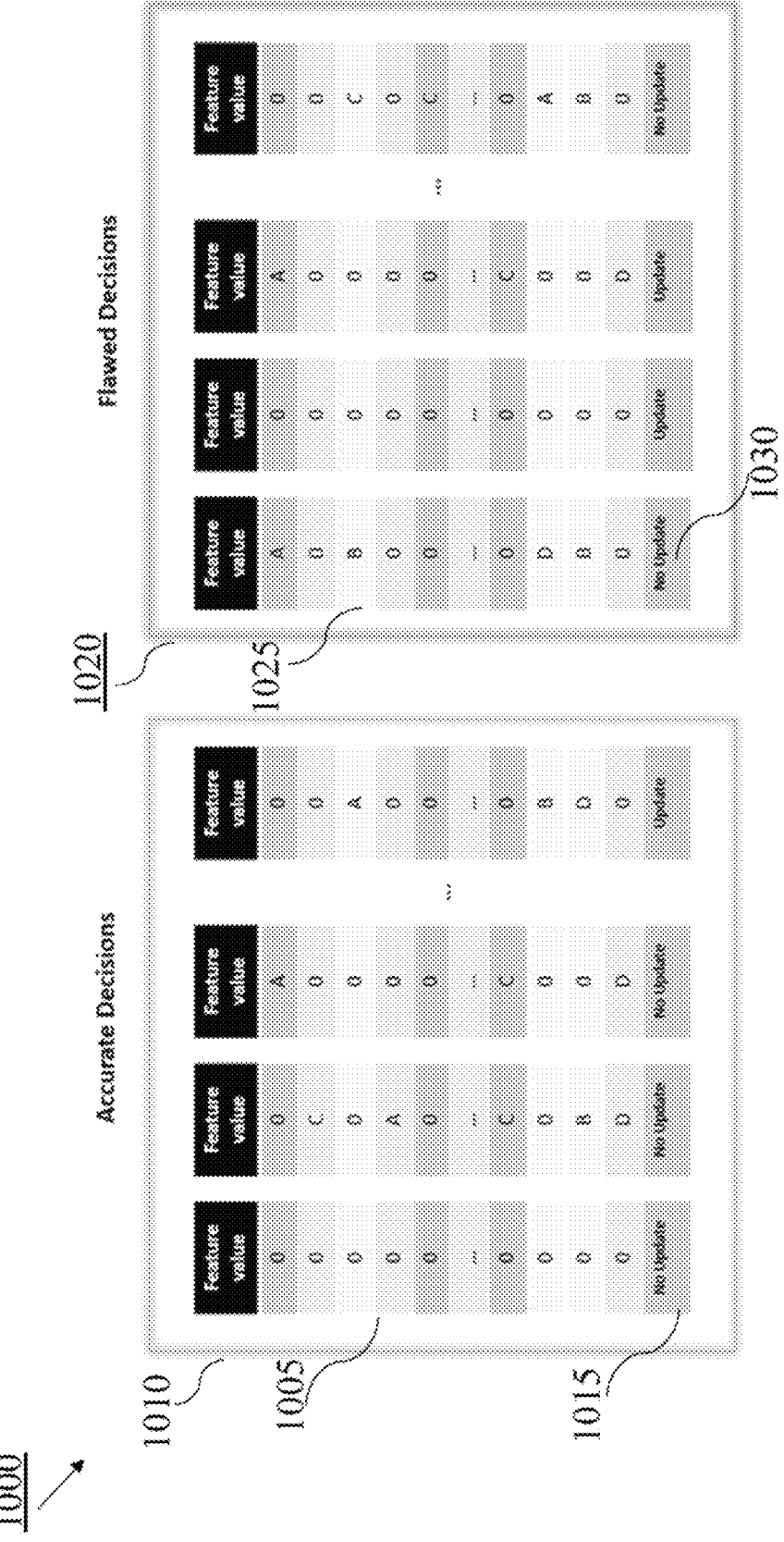
FIG. 10 is an example of positively and negatively labeled batches of batch-representation-vector of drift type for each feature in a selected set of features of a batch of financial transactions data, in accordance with some embodiments of the present disclosure.

According to some embodiments of the present disclosure, element 1010 in FIG. 10 provides examples of positively labeled batches and element 1020 in FIG. 10 provides negatively labeled batches. Positively labeled batches indicate cases where there are clear and evident incorrect decisions regarding whether to update or not update the online model 110b in FIG. 1B. Similarly, negatively labeled batches also demonstrate instances where incorrect decisions are apparent.

FIG. 10 is an example 1000 of positively and negatively labeled batches of batch-representation-vector of drift type for each feature in a selected set of features of a batch of financial transactions data, in accordance with some embodiments of the present disclosure.

According to some embodiments of the present disclosure, element 1010 provides examples of positively labeled batches and element 1020 provides negatively labeled batches. Positively labeled batches indicate cases where there are clear and evident incorrect decisions regarding whether to update or not update the online model.

According to some embodiments of the present disclosure, for example in element 1010, batch-representation-vector 1005 has no drift across any feature within the batch. Consequently, the decision of MetaBDMM model 160b in FIG. 1B may be not to update 1015 the online model, such as online model 110b in FIG. 1B and such as online model 110c in FIG. 1C may align with this observation, indicating a good decision based on the absence of data drift.

According to some embodiments of the present disclosure, for example in element 1020, batch-representation-vector 1025 drifts occurring in multiple types across the most important features in positions 1, 5 and 7. These important features play a significant role in understanding the underlying processes of machine learning models. When data drifts are observed in the three most important features, it suggests a higher likelihood that the decision should be to update the online model. However, in this case, the decision not to update 1030 the online model, does not align with the presence of drift, indicating an incorrect decision.

Figure 11A:
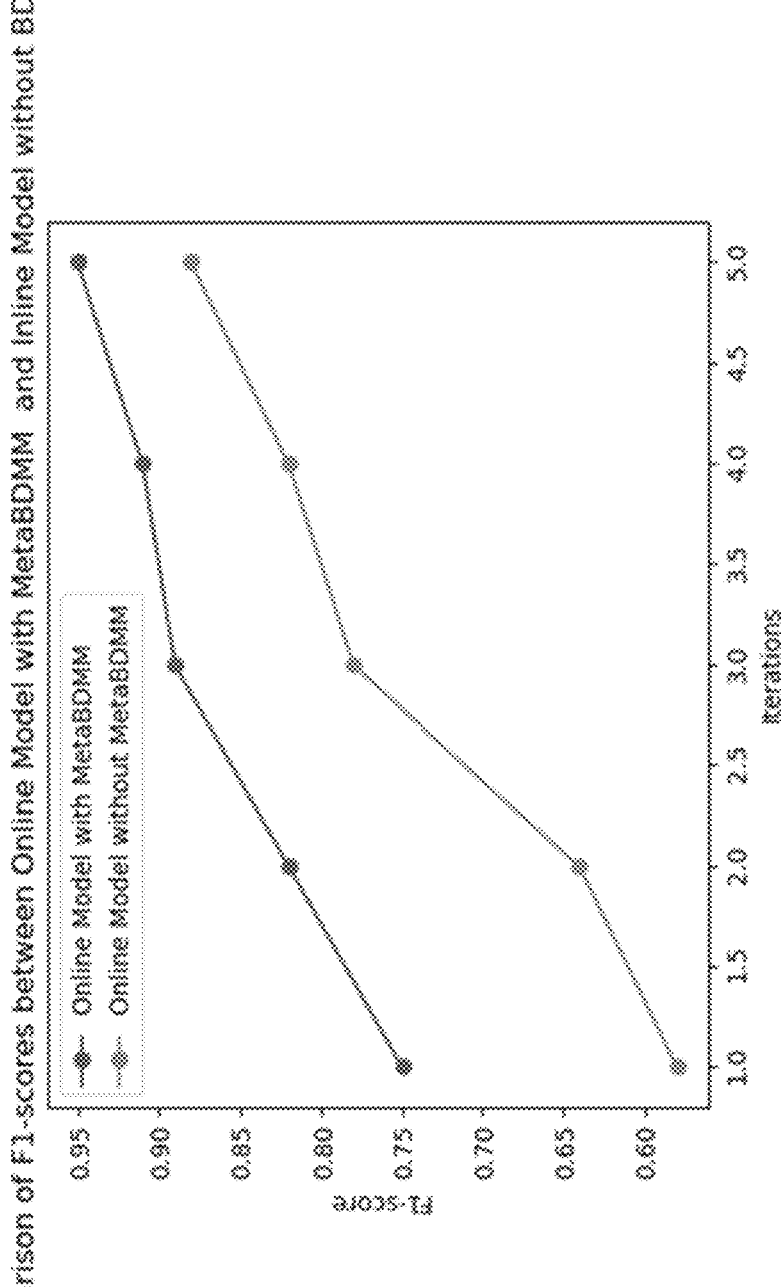
FIGS. 11A-11B are graphs of performance comparison between an online fraud detection ML model that received an indication when to update and an online fraud detection ML model that didn't receive an indication when to update, in accordance with some embodiments of the present disclosure.
Figure 11B:
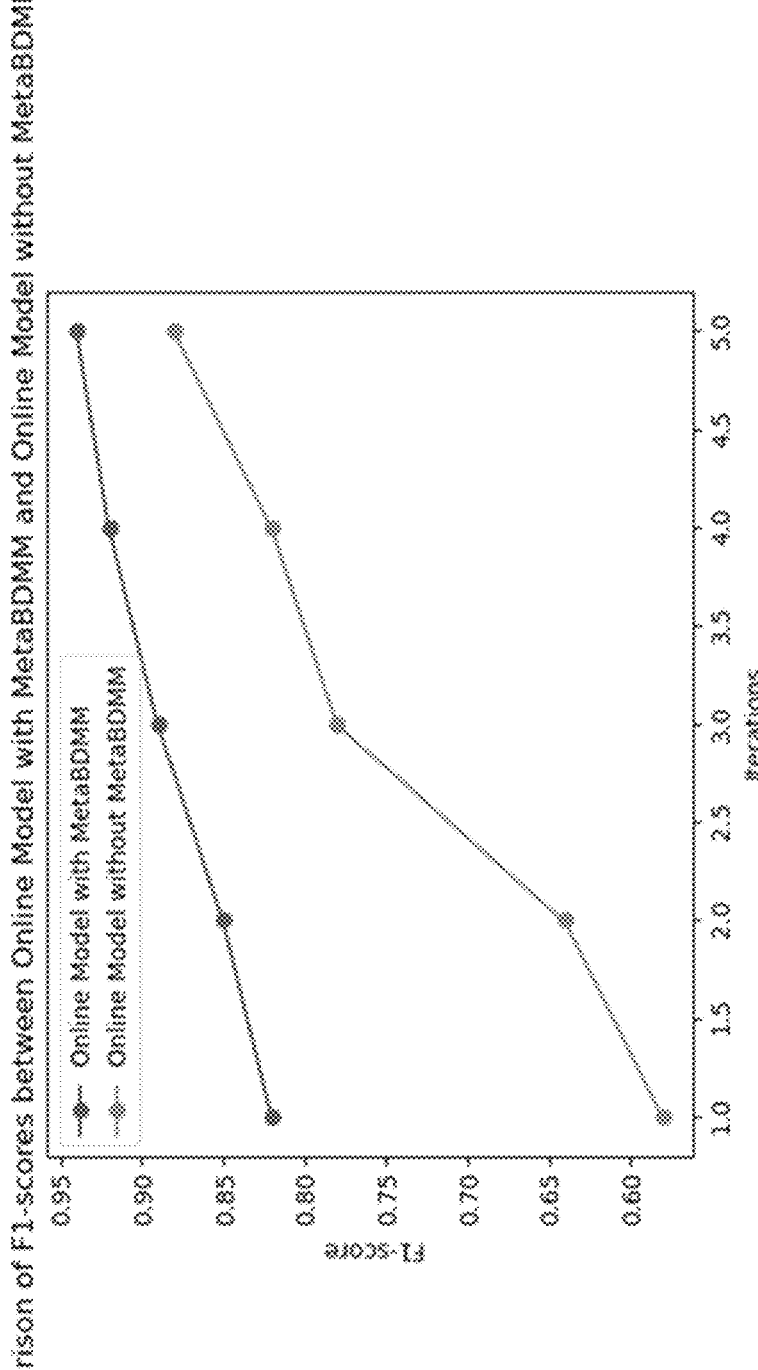

FIGS. 11A-11B are graphs performance comparison between an online fraud detection ML model that received an indication when to update and an online fraud detection ML model that didn't receive an indication when to update, in accordance with some embodiments of the present disclosure;

According to some embodiments of the present disclosure, two distinct online models have been selected. Each online model was compared with its corresponding version, which relied on the MetaBDMM model, such as MetaBDMM model 160b in FIG. 1B and such as MetaBDMM model 160c in FIG. 1C. By conducting this comparison, the performance of the online models in various scenarios has been evaluated and analyzed.

According to some embodiments of the present disclosure, Mondrian Trees has been used as online decision tree learning algorithm that can adapt to changing data distributions over time.

According to some embodiments of the present disclosure, an Online Passive-Aggressive Algorithm has been run which is belong to a family of online learning algorithms used for classification and regression tasks. These algorithms update their model parameters incrementally to handle streaming data.

According to some embodiments of the present disclosure, based on the results and evaluation performance of two online models, both with and without the MetaBDMM model, such as MetaBDMM model 160b in FIG. 1B and such as MetaBDMM model 160c in FIG. 1C for decision prediction on updating online models, such as online model 110b in FIG. 1B, and such as online model 110bc in FIG. 1C, it can be concluded that relying on the MetaBDMM model, significantly improves the performance of both the Mondrian Trees model and the Online Passive-Aggressive algorithm.

According to some embodiments of the present disclosure, the graphs in FIGS. 11A-11B demonstrate this difference in performance. The F1-scores obtained with the MetaBDMM model show a significant increase compared to the F1-scores without it. This highlights the significance of the difference in performance between the two scenarios. The improvement in performance provided by the MetaBDMM model suggests its effectiveness in aiding decision-making regarding updating online models. By incorporating the predictions of the MetaBDMM model, both the Mondrian Trees model and the Online Passive-Aggressive algorithm achieve enhanced performance, potentially leading to more accurate and reliable outcomes. Overall, these findings emphasize the importance of leveraging the MetaBDMM model, as a valuable tool for improving the performance of online models, such as online mode 110b in FIG. 1B and such as online mode 110c in FIG. 1C in various evaluation scenarios.

Figure 12:
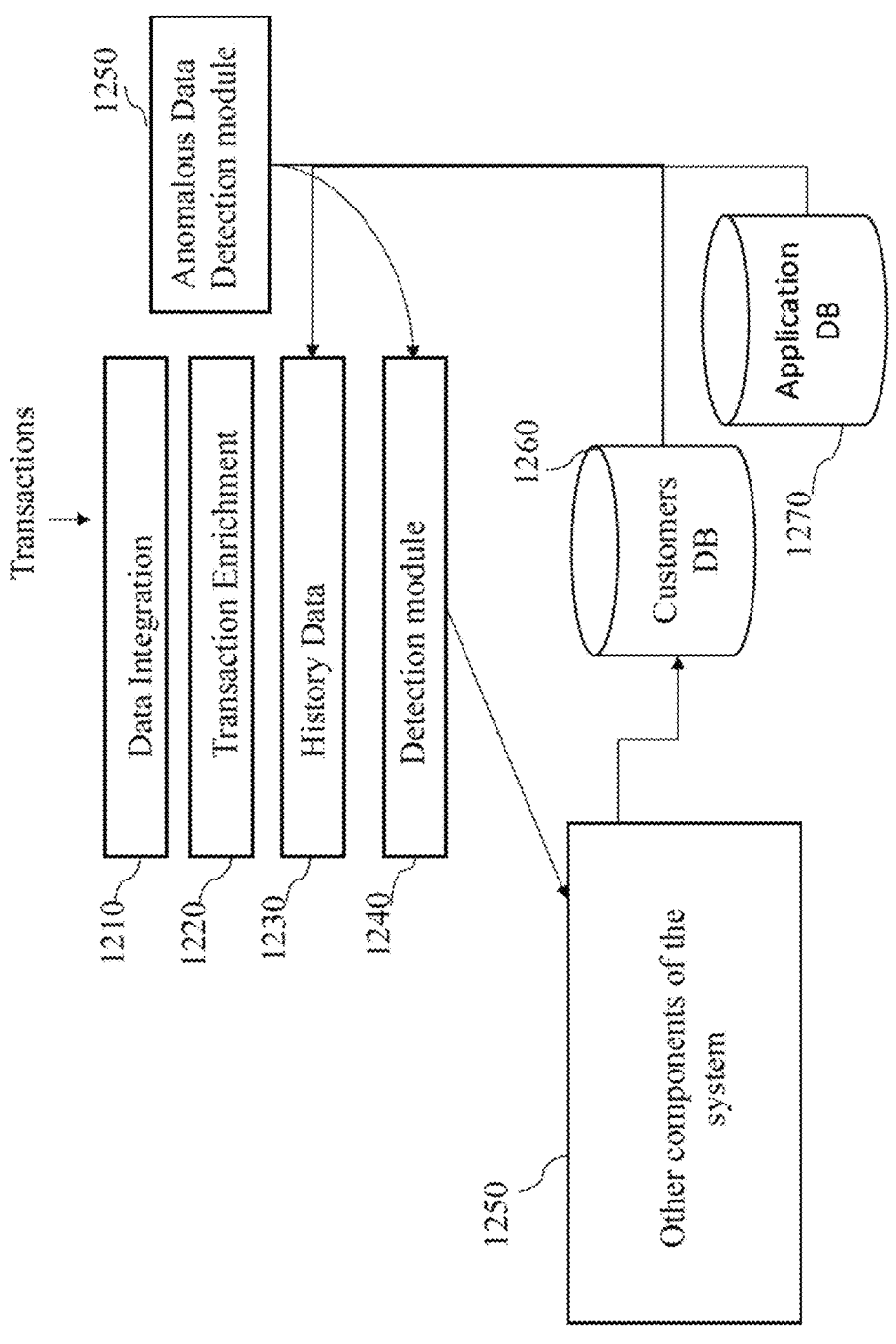
FIG. 12 illustrates a detection module in a global system, in accordance with some embodiments of the present disclosure.

FIG. 12 illustrates a fraud detection module in a global system 1200, in accordance with some embodiments of the present disclosure.

According to some embodiments of the present disclosure, transactions that satisfy certain criteria may indicate events that may be interesting for the analyst. An analyst can define events the system identifies and profiles when processing the transaction. This data can be used to create complementary indicative features using the custom indicative features mechanism or Structured Model Overlay (SMO). SMO is a framework in which the analyst gets all outputs of built-in and custom analytics as input to enhance the detection results with issues and set the transaction's risk score. For example, the analyst can define an event that says: amount >$100,000. The system profiles aggregations for all transactions that trigger this event, e.g., the first time it happened for the transaction party, etc.

According to some embodiments of the present disclosure, once custom events are defined, the analyst can use predefined indicative feature templates to enrich built-in model results with new indicative feature calculations. Proceeding with the example from the custom events section— The analyst can now create an indicative feature that says that if it has been more than a year since the customer performed a transaction with an amount greater than $100,000, then add 10 points to the overall risk score of the model, such as detection module 1240 and such as online model 110b in FIG. 1B and online model 110c in FIG. 1C.

According to some embodiments of the present disclosure, the analytics logic is implemented in two phases, where only a subset of the transactions goes through the second phase, as determined by a filter.

According to some embodiments of the present disclosure, the detection log contains transactions enriched with analytics data such as indicative features, results, and variables. The Analyst can configure which data should be exported to the log and use it for pre- and post-production tuning.

According to some embodiments of the present disclosure, the transaction detection flow consists of multiple steps, data fetch for detection (detection period sets and profile data for the entity), variable calculations, Analytics models consisting of different indicative feature instances, and SMO.

According to some embodiments of the present disclosure, the detection process is triggered for each transaction. However, most of the analytics logic relates to entities rather than transactions. For example, all transactions for the same entity, party, trigger detection, whilst the detection logic is based on the party activity in the detection period. For performance reasons (technical), the detection flow for transactions is divided into two phases, phase A and phase B. Analytics logic is run after phase A to decide whether it is necessary to run phase B. The decision not to proceed to phase B is due to two reasons: either the transaction is suspicious, or the transaction is not suspicious. If it is not yet clear if the transaction is suspicious, processing continues with phase B detection.

According to some embodiments of the present disclosure, initial fetch, fetches the profiles and accumulation period data needed for the detection; for example, for a card, it would fetch the card profiles and device profiles and the previous activity by card set. The fetched data is used for detection, Adversarial Auto Encoder (AAE), and Policy Manager. Partial Model Calculation, calculates custom events. Performs analytics models, both internal indicative features and indicative custom features. This step determines the analytics risk score. Variable Enhancements, runs phase A variables. The final step of the SMO model is to recommend whether or not to proceed to phase B, although the filter makes the final decision.

According to some embodiments of the present disclosure, in second fetch the retrieval is based on more complex queries, for example, multiple payees per transaction. Complete model calculation performs additional internal and custom indicative features. Variable enhancements component performs more calculations based on newly retrieved sets. The SMO decides the final score for the transaction. This can be based on further models.

According to some embodiments of the present disclosure, activities are a way to logically group events in the client's systems. Each channel is an activity, for example, a Web activity. Each type of service is an activity, for example, an Internal Transfer activity. Each combination of an activity and a type of service is an activity, for example, Web Internal Transfer Activity. Activities can span multiple channels and services, for example, the transfer activity, which is any activity that results in a transfer. Transactions can be associated with multiple activities.

According to some embodiments of the present disclosure, activities are divided into multiple base activities. Base activities represent the customer's most specific activity and determine which detection models are calculated for a transaction. Each transaction is mapped to one and only one base activity. A base activity is calculated for each transaction. This default base activity is usually determined according to the channel, transaction type, additional fields, and calculations.

According to some embodiments of the present disclosure, the base activity of a transaction is generally set by combining the channel type and the transaction type as mapped in data integration. The definition of some base activities is also based on the value of an additional field or a calculated indicator, as detailed in the tables in this section.

According to some embodiments of the present disclosure, data pre-processing, such as data pre-processing 130b in FIG. 1B may include checking the filtration and then should the online model, such as detection module 1240, and such as online model 110b in FIG. 1B and such as online model 110c in FIG. 1C, refer to all or only some of the events, add/edit payee, reject notifications and account service events. Are the differences in data mapping for different types of events. Is versioning in scope. Which events/versions the Financial Institution (F1) is alerting/blocking.

According to some embodiments of the present disclosure, feature engineering may include for example, review data mapping and validation documents—exclude data elements associated with wrong mapping or known data issues.

1. Exclude all keys fields such as party-Key
2. Exclude all scrambled fields. If a meaningful field is found to be scrambled—discuss it with PS/Product team so that scrambling will be removed before the next tuning
3. Exclude PM Operational fields those are not available in RT.
4. Review data elements that populated only for a small fraction of the population—is it a true 'rare' feature/value, or perhaps it is caused by a data issue?Furthermore, it is recommended to exclude 'suspicious' features (lift>1) that got populated by less than 50 fraudulent transactions.
5. Exclude features from an external scoring system or an external list such as 'External Score 1' or 'External High Focus Payee'—it's better to avoid a dependency between online model and external systems, which might change in the future. Those types of features can be used in PM rules.
6. Better to avoid features with a very specific 'short life' value such as specific geographical region, specific IP address, or specific amount values.
7. Calculate the time difference between different date fields, such as the last password change date and the transaction's date
8. Feature engineering—transactional raw data is used.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computer-implemented method for determining when an update of an online fraud detection Machine Learning (ML) model is required, said computer-implemented method comprising:

(i) receiving a batch of financial transactions data,
    wherein each financial transaction in the batch of financial transactions data includes one or more features,
(ii) selecting a set of features from the one or more features, by operating a feature engineering component;
(iii) detecting a drift and a drift type in each feature in the selected set of features, by operating a drift detection model thereon;
(iv) generating a batch-representation-vector of drift type for each feature in the selected set of features,
    wherein each feature in the selected set of features is assigned a weight;
(v) receiving a predicted-decision of update-needed by forwarding the generated batch-representation-vector to a trained Meta-based Decision Making (MetaBDMM) model, wherein the predicted-decision of update-needed of the MetaBDMM model is based on a drift type of a preconfigured number of features in the selected set of features having highest assigned weight, and
    wherein the predicted-decision of update-needed is one of: (a) update-needed; and (b) update-not-needed, and
(vi) forwarding the predicted-decision of update-needed to the online fraud detection ML model,
    wherein when the predicted-decision of update-needed is update-needed, the online fraud detection IL model performs an update and when the predicted-decision of update-needed is update-not-needed the online fraud detection ML model doesn't perform the update.

2. The computer-implemented method of claim 1, wherein the MetaBDMM model updates the received batch with the predicted-decision of update-needed and stores it in a database of labeled and unlabeled batches of financial transactions.

3. The computer-implemented method of claim 2, wherein training of the MetaBDMM model comprising:
    providing one or more labeled batches of financial transactions data,
        wherein each labeled batch includes: (i) batch-representation-vector of drift type for each feature in a selected set of features; and (ii) predicted-decision of update-needed, and
        wherein each labeled batch is positively labeled or negatively labeled.

4. The computer-implemented method of claim 3, wherein each updated batch is positively labeled or negatively labeled based on a performance metric of the online fraud detection ML model for the received batch.

5. The computer-implemented method of claim 3, wherein the performance metric of the online fraud detection IL model for the updated batch is calculated by a comparison of predictions of the online fraud detection ML model for the updated batch and received client feedback as to the predictions of the online fraud detection ML model for the fmancial transactions in the updated batch, and
    wherein the updated batch is positively labeled when there is a match between the predicted-decision of update-needed of the updated batch and the performance metric of the online fraud detection ML model for the updated batch and negatively labeled when there is no match between the performance metric of the online fraud detection ML model for the updated batch.

6. The computer-implemented method of claim 1, wherein each feature in the selected set of features is at least one of indicative, informative, non-redundant, and non-correlated representative.

7. The computer-implemented method of claim 1, wherein the drift type is at least one of: (i) abrupt; (ii) gradual; (iii) cyclic; (iv) spike; and (v) none.

8. The computer-implemented method of claim 1, wherein the drift detection model is SeqDrift model.

9. A computerized-system for determining when an update of an online fraud detection Machine Learning (ML) model is required, said computerized-system comprising:
    a database of labeled and unlabeled batches of financial transactions;
    a feature engineering component;
    a drift detection model;
    a trained MetaBDMM model:
    a memory to store the database of labeled and unlabeled batches; and
    a processor, said processor is configured to:
        (i) receive a batch of financial transactions data,
            wherein each financial transaction in the batch of financial transactions data includes one or more features,
        (ii) operate a feature engineering component to select a set of features from the one or more features of the financial transactions;
        (iii) detect a drift and a drift type in each feature in the selected set of features, by operating the drift detection model thereon;
        (iv) generate a batch-representation-vector of drift type for each feature in the selected set of features,
            wherein each feature in the selected set of features is assigned a weight:
        (vii) receive a predicted-decision of update-needed by forwarding the generated batch-representation-vector to a trained Meta-based Decision Making (MetaBDMM) model, wherein the predicted-decision of update-needed of the MetaBDMM model is based on a drift type of a preconfigured number of features in the selected set of features having highest assigned weight, and
            wherein the predicted-decision of update-needed is one of: (a) update-needed; and (b) update-not-needed, and
        (v) forward the predicted-decision of update-needed to the online fraud detection ML model,
            wherein when the predicted-decision of update-needed is update-needed, the online fraud detection ML model performs an update and when the predicted-decision of update-needed is update-not-needed the online fraud detection ML model doesn't perform the update.

* * * * *